(12) United States Patent
Fukuda et al.

(10) Patent No.: US 12,449,575 B2
(45) Date of Patent: Oct. 21, 2025

(54) REFLECTIVE POLARIZED LIGHT SEPARATION AND DIFFRACTION ELEMENT AND OPTICAL MEASUREMENT DEVICE COMPRISING SAME

(71) Applicants: JASCO CORPORATION, Tokyo (JP); NATIONAL INSTITUTE OF ADVANCED INDUSTRIAL SCIENCE AND TECHNOLOGY, Tokyo (JP)

(72) Inventors: Takashi Fukuda, Ibaraki (JP); Akira Emoto, Ibaraki (JP); Yoshihito Narita, Tokyo (JP); Hiroshi Hayakawa, Tokyo (JP); Yuichi Miyoshi, Tokyo (JP)

(73) Assignees: JASCO CORPORATION, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 721 days.

(21) Appl. No.: 17/785,737

(22) PCT Filed: Dec. 16, 2019

(86) PCT No.: PCT/JP2019/049109
§ 371 (c)(1),
(2) Date: Jun. 15, 2022

(87) PCT Pub. No.: WO2021/124380
PCT Pub. Date: Jun. 24, 2021

(65) Prior Publication Data
US 2023/0048604 A1    Feb. 16, 2023

(51) Int. Cl.
*G02B 5/18* (2006.01)
*G01J 4/00* (2006.01)
(Continued)

(52) U.S. Cl.
CPC .............. *G02B 5/1861* (2013.01); *G01J 4/00* (2013.01); *G02B 5/001* (2013.01); *G02B 27/1086* (2013.01)

(58) Field of Classification Search
None
See application file for complete search history.

(56) References Cited

U.S. PATENT DOCUMENTS

2006/0126183 A1* 6/2006 Hasman ............... G02B 5/1809
359/573
2011/0255390 A1 10/2011 Hirai
(Continued)

FOREIGN PATENT DOCUMENTS

CN    102495444    6/2012
CN    106200107    12/2016
(Continued)

OTHER PUBLICATIONS

International Search Report issued in International Patent Application No. PCT/JP2019/049109, dated Mar. 10, 2020, along with an English translation thereof.
(Continued)

*Primary Examiner* — Derek S. Chapel
(74) *Attorney, Agent, or Firm* — Greenblum & Bernstein, P.L.C.

(57) ABSTRACT

A reflective polarized-light separating diffraction-element including a substrate, a reflection surface formed on a surface of the substrate, and a lattice structured body assembly that is provided on the reflection surface and exhibits a form birefringence ($\Delta n^*$). The lattice structured body assembly includes lattice structured bodies of a plurality of patterns having lattice structures of different azimuths, and these lattice structured bodies of a plurality of patterns are aligned in a predetermined direction on the reflection surface (Continued)

so that the azimuths of the lattice structures change in a structurally periodic manner.

8 Claims, 11 Drawing Sheets

(51) Int. Cl.
*G02B 5/00* (2006.01)
*G02B 27/10* (2006.01)

(56) References Cited

U.S. PATENT DOCUMENTS

| | | | |
|---|---|---|---|
| 2015/0316476 A1* | 11/2015 | Acher | G01J 3/0224 356/327 |
| 2016/0033698 A1 | 2/2016 | Escuti et al. | |
| 2017/0276597 A1 | 9/2017 | Emoto et al. | |
| 2019/0086597 A1 | 3/2019 | Kawakami et al. | |

FOREIGN PATENT DOCUMENTS

| | | | |
|---|---|---|---|
| EP | 3187856 | 7/2017 | |
| JP | 2004-341024 | 12/2004 | |
| JP | 2009-68884 | 4/2009 | |
| JP | 2012-159802 | 8/2012 | |
| JP | 2017-522601 | 8/2017 | |
| WO | 2016/031567 | 3/2016 | |
| WO | WO-2017104661 A1 * | 6/2017 | ............ A61B 3/10 |
| WO | 2017/150568 | 9/2017 | |

OTHER PUBLICATIONS

Extended European Search Report Issued in Corresponding EP Patent Application No. 19956789.2, dated Jul. 31, 2023.
Office Action issued in Corresponding CN Patent Application No. 201980103062.6, dated Aug. 2, 2025, along with an English translation thereof.

* cited by examiner

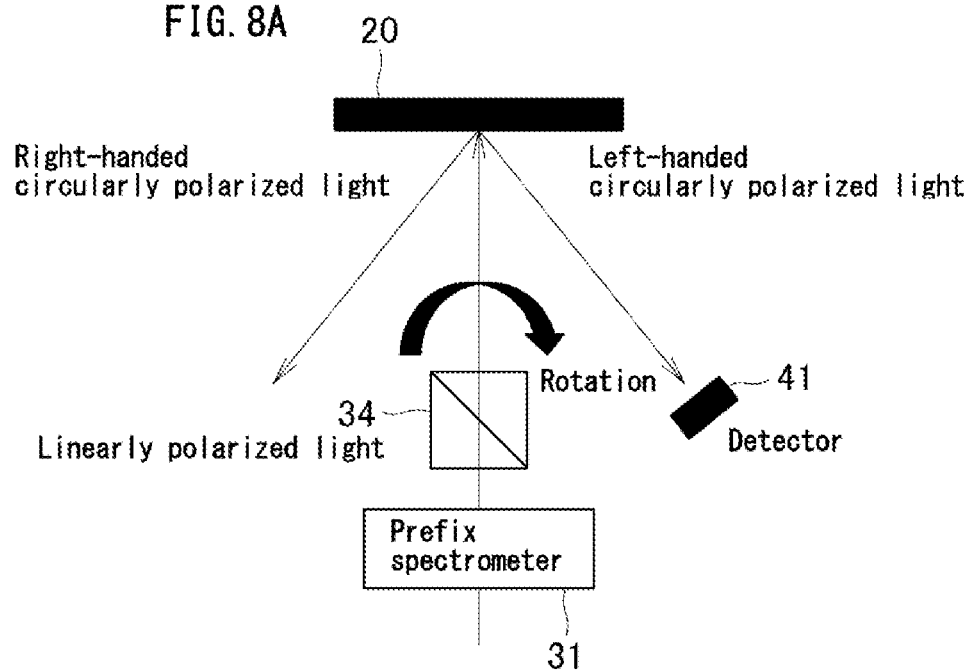
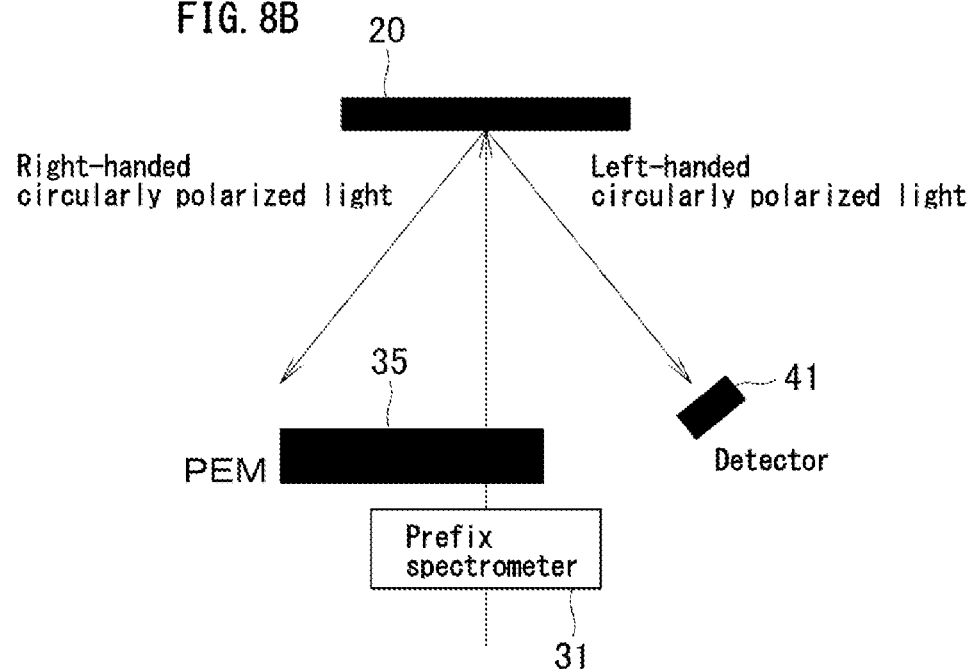

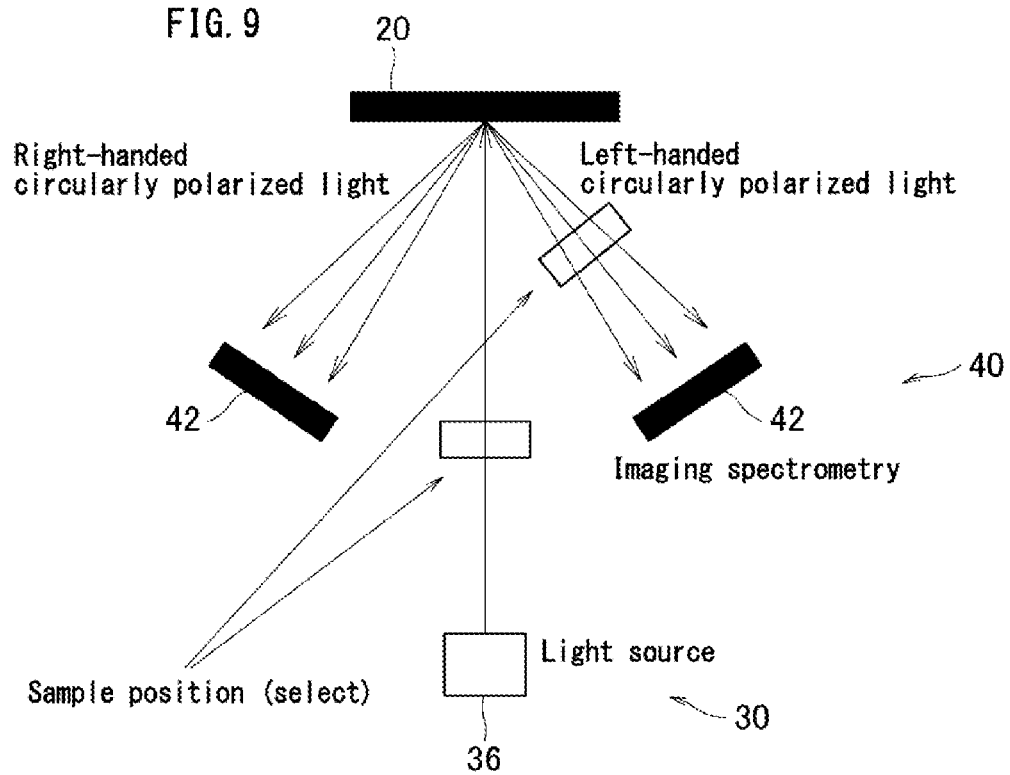

Transmissive polarized-light diffraction-grating

Reflective polarized-light diffraction-grating (having outermost surface coated with silver)

REFLECTIVE POLARIZED LIGHT SEPARATION AND DIFFRACTION ELEMENT AND OPTICAL MEASUREMENT DEVICE COMPRISING SAME

TECHNICAL FIELD

The present invention relates to a reflective polarized-light separating diffraction-element, and an optical measurement device such as a dichroism measurement device or a birefringence measurement device.

BACKGROUND ART

The crossed-Nicol method is conventionally known as a method for measuring birefringence of a measurement target, and a polarizer and an analyzer needed to be rotated relatively to the measurement target. Whereas, the birefringence measurement device using a transmissive polarized-light separating diffraction-grating described in Patent Literature 1 has been gathering attention for the point that such rotation mechanism as described above becomes unnecessary.

In transmissive polarized-light separating diffraction-gratings, when a right-handed circularly-polarized light is incident on an incident surface of the grating, the right-handed circularly-polarized light emerges from an exit surface on the opposite side in a direction of a +1 order diffracted light. Moreover, when the incident light is a left-handed circularly-polarized light, the left-handed circularly-polarized light emerges from a reflection surface in a direction of a −1 order diffracted light. In other words, the transmissive polarized-light separating diffraction-grating has a property of dividing the right-handed circularly-polarized light and the left-handed circularly-polarized light into directions of ±1 order diffracted lights. FIG. 3 of Patent Literature 1 is a graph of which each intensity of ±1 order diffracted lights of when the polarization state (ellipticity $\tan^{-1}(b/a)$) of the incident light to the polarized-light separating diffraction-grating is changed variously are plotted.

When the incident light is an elliptically polarized light (ellipticity=+15°, +30°) that is close to a right-handed circularly-polarized light (ellipticity=)+45°, the intensity of the +1 order diffracted light becomes larger than the −1 order diffracted light.

By contrast, when the incident light is an elliptically polarized light (ellipticity=−15°, −30°) that is close to a left-handed circularly-polarized light (ellipticity=−45°), the intensity of the −1 order diffracted light becomes larger than the +1 order diffracted light.

When the incident light is a linearly polarized light (ellipticity=0°), the intensities of the ±1 order diffracted lights become equivalent. The linearly polarized light can be regarded as one of which the right- and left-handed circularly-polarized lights being in phase with each other are overlapped; therefore, it can be said that, by the transmissive polarized-light separating diffraction-grating, the right-handed circularly-polarized light component of the linearly polarized light is divided into the direction of the +1 order diffracted light and the left-handed circularly-polarized light component of the linearly polarized light is divided into the direction of the −1 order diffracted light.

In the birefringence measurement device of Patent Literature 1, when the right-handed circularly-polarized light transmits the measurement target, the polarization state (ellipticity) of the right-handed circularly-polarized light changes in accordance with birefringence of the measurement target. When the transmitted light is incident on the polarized-light separating diffraction-grating, the intensities of ±1 order diffracted lights in accordance with the polarization state of the transmitted light are detected. Accordingly, the polarization state (ellipticity) of the transmitted light can be known from the balance of the two detected values of intensities, and, as a result, birefringence of the measurement target can be known.

CITATION LIST

Patent Literature

Patent Literature 1: International Publication No. WO2016/031567 A1

SUMMARY OF INVENTION

Technical Problem

The polarized-light separating diffraction-gratings as described above have been developed for transmissive polarized-light separating diffraction-gratings; however, reflective polarized-light separating diffraction-gratings have not been developed. One reason for this was followings. The transmissive polarized-light separating diffraction-grating comprises a periodic fine groove structure called as form birefringence ($\Delta n^*$), and has a property of imparting a phase difference to a light that transmits therethrough, and further generating a diffracted light. Even when a reflective polarized-light separating diffraction-grating was to be configured based on the above transmissive diffraction-grating, it is difficult to configure the reflective polarized-light separating diffraction-grating because a specific mechanism of how the property change by impartation of a reflective property was not revealed.

Whereas, the present inventors considered that the reflective polarized-light separating diffraction-grating is extremely advantageous for downsizing disposition of optical paths in various measurement devices using the same, and greatly contributes to miniaturization of various measurement devices.

The object of the present invention is to reveal a specific mechanism of a reflective polarized-light separating diffraction-element, provide a reflective polarized-light separating diffraction-grating suitable for miniaturizing various measurement devices, and provide an optical measurement device comprising the same.

Solution to Problem

That is, a reflective polarized-light separating diffraction-element according to the present invention comprises:
  a substrate;
  a reflection surface formed on a surface of the substrate; and
  a lattice structured body assembly that is provided on the reflection surface and exhibits a form birefringence ($\Delta n^*$),
wherein
  the lattice structured body assembly includes lattice structured bodies of a plurality of patterns having lattice structures of different azimuths, and
  these lattice structured bodies of a plurality of patterns are aligned in a predetermined direction on the reflection surface so that the azimuths of the lattice structures change in a structurally periodic manner.

According to this configuration, the lattice structured bodies of a plurality of patterns are aligned on the reflection surface with a certain regularity. Accordingly, when the incident light transmits the lattice structured bodies of a plurality of patterns, "impartation of a phase" occurs by the lattice structured bodies, and "difference of the direction of the diffracted light" occurs simultaneously by a structurally periodic change of the patterns. Such property is represented as "T(x)".

Next, an influence of "complex refraction index" on the reflection surface occurs to the transmitted light during its reflection. Such property is represented as "$R_M$".

Since the reflected light transmits the lattice structured bodies of a plurality of patterns, it is affected by the above-described property "T(x)" again.

In this way, it can be said that the reflective polarized-light separating diffraction-element of the present invention has a property represented as "$T(x) \cdot R_M \cdot T(x)$". As a result of calculation by this matrix model, the inventors succeeded to prove that, by the reflective polarized-light separating diffraction-element of the present invention, the component of the right-handed circularly-polarized light contained in the incident light is divided into the direction of the +1 order diffracted light and the component of the left-handed circularly-polarized light is divided into the direction of the −1 order diffracted light. Therefore, by using the reflective polarized-light separating diffraction-element of the present invention, the polarization state of the incident light can be known based on the intensities of each reflected light that has become the ±1 order diffracted lights.

Furthermore, by using the reflective polarized-light separating diffraction-element having such property, measurement devices such as a circular dichroism measurement device or a birefringence measurement device can be made extremely compact.

Moreover, it is preferred that the surface of the substrate is formed in a stepped form along the predetermined direction,
  the lattice structured bodies of a plurality of patterns are also provided in a stepped form in accordance with the stepped form of the surface of the substrate, and
  the stepped form of the surface of the substrate is repeated in accordance with a structurally periodic change of the azimuth.

Moreover, the reflection surface and the lattice structured body are preferably formed on both surfaces of the substrate, and the polarized-light separating diffraction-element can be used invertedly.

A reflective polarized-light separating diffraction-element according to the present invention comprises:
  a substrate; and
  a lattice uneven structured body assembly that is formed on a surface of the substrate and exhibits a form birefringence ($\Delta n^*$),
wherein
  an uneven surface of the lattice uneven structured body assembly is a reflection surface,
  the lattice uneven structured body assembly includes lattice uneven structured bodies of a plurality of patterns having lattice uneven structures of different azimuths, and
  these lattice uneven structured bodies of a plurality of patterns are aligned on the surface of the substrate in a predetermined direction so that the azimuths of the lattice uneven structures change in a structurally periodic manner.

According to this configuration, the lattice uneven structured bodies of a plurality of patterns are aligned with a certain regularity, and the uneven surface thereof is also a reflection surface. Accordingly, when the incident light reflects the uneven surface, an influence of "complex refractive index" on the reflection surface occurs. Such property is represented as "$R_M$".

Moreover, to the reflected light, "impartation of a phase" occurs by the lattice uneven structured bodies of a plurality of patterns, and "difference of the direction of the diffracted light" occurs by a structurally periodic change of the pattern. Such property is represented as "T(x)".

In this way, it can be said that the reflective polarized-light separating diffraction-element of the present invention has a property represented as "$R_M \cdot T(x)$". As a result of calculation by this matrix model, the inventors succeeded to prove that, by the reflective polarized-light separating diffraction-element of the present invention, the component of the right-handed circularly-polarized light contained in the incident light is divided into the direction of the +1 order diffracted light and the component of the left-handed circularly-polarized light is divided into the direction of the −1 order diffracted light. Accordingly, by using the reflective polarized-light separating diffraction-element of the present invention, the polarization state of the incident light can be known based on the intensities of each reflected light that has become the ±1 order diffracted lights.

Furthermore, by using the reflective polarized-light separating diffraction-element having such property, measurement devices such as a circular dichroism measurement device or a birefringence measurement device can be made extremely compact.

Moreover, it is preferred that the surface of the substrate is formed in a stepped form along the predetermined direction,
  the lattice uneven structured bodies of a plurality of patterns are also formed in a stepped form in accordance with the stepped form of the surface of the substrate, and
  the stepped form of the surface of the substrate is repeated in accordance with a structurally periodic change of the azimuth.

Moreover, the lattice uneven structured body and the reflection surface are preferably formed on both surfaces of the substrate, and the polarized-light separating diffraction-element can be used invertedly.

A reflective polarized-light separating diffraction-element according to the present invention comprises:
  a substrate;
  a reflection surface formed on a surface of the substrate; and
  a plurality of birefringent structured bodies aligned on the reflection surface in a predetermined direction,
wherein
  each birefringent structured body has a large number of birefringent portions disposed within one segment, and the plurality of birefringent portions are aligned along the predetermined direction such that an orientation of an optical axis of birefringence of each birefringent portion continuously changes for at least 180 degrees within a surface parallel to the reflection surface.

According to this configuration, each birefringent structured body provided on the reflection surface has a large number of birefringent portions within a segment thereof, and these birefringent portions are aligned with a certain regularity. Accordingly, to the incident light, "impartation of a phase" occurs upon transmitting the birefringent portion, and "difference of the direction of the diffracted light" occurs by periodic change of the directions of the optical axes of birefringence of these birefringent portions. Next, to the transmitted light, an influence of "complex refractive index" on the reflection surface occurs during its reflection. Since the reflected light transmits the birefringent portion again, it is affected similarly.

In this way, similar to the above-described reflective polarized-light separating diffraction-element comprising the lattice structured bodies, the reflective polarized-light separating diffraction-element comprising the birefringent structured bodies of the present invention divides the component of the right-handed circularly-polarized light contained in the incident light into the direction of the +1 order diffracted light and the component of the left-handed circularly-polarized light into the direction of the −1 order diffracted light. Accordingly, by using the reflective polarized-light separating diffraction-element of the present invention, the polarization state of the incident light can be known based on the intensities of each reflected light that has become the ±1 order diffracted lights.

Moreover, the birefringent structured body and the reflection surface are preferably formed on both surfaces of the substrate, and the polarized-light separating diffraction-element can be used invertedly.

An optical measurement device according to the present invention comprises:
  any one of the reflective polarized-light separating diffraction-elements;
  an incident optical means that makes a measurement light incident on the reflective polarized-light separating diffraction-element; and
  a detection optical means that detects lights in at least one or more specific directions among reflected lights that are diffracted by the reflective polarized-light separating diffraction-element,
wherein
  the optical measurement device measures optical properties of a measurement target disposed on an optical path of the incident optical means or the detection optical means.

As described above, by using the reflective polarized-light separating diffraction-element, the layout of the optical path can be easily downsized, and the optical measurement device such as a circular dichroism measurement device or a birefringent measurement device can be made extremely compact. In particular, since the right- and left-handed circularly-polarized light components contained in the incident light to the reflective polarized-light separating diffraction-element are divided into the directions of the ±1 order diffracted lights in a circular dichroism measurement device, two circularly-polarized light components can be detected "simultaneously". Accordingly, time required for circular dichroism measurement can be significantly shortened.

BRIEF DESCRIPTION OF DRAWINGS

FIG. 8A is a diagram illustrating an overall structure of an optical measurement device according to an eighth embodiment, and FIG. 8B is a diagram illustrating an overall structure of an optical measurement device according to a nineth embodiment.

FIG. 9 is a diagram illustrating an overall structure of an optical measurement device according to a tenth embodiment.

DESCRIPTION OF EMBODIMENTS

Figure 1A:
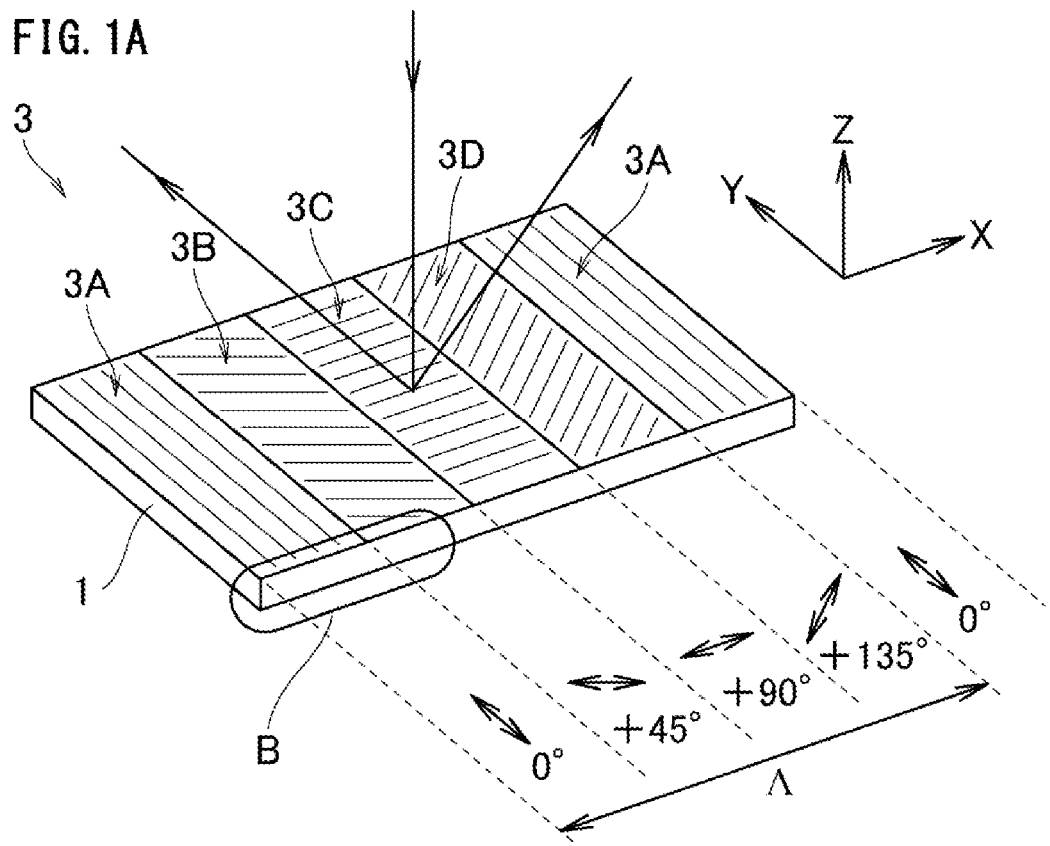
FIG. 1A is a diagram illustrating an overall structure of a reflective polarized-light separating diffraction-grating according to a first embodiment.
Figure 1B:
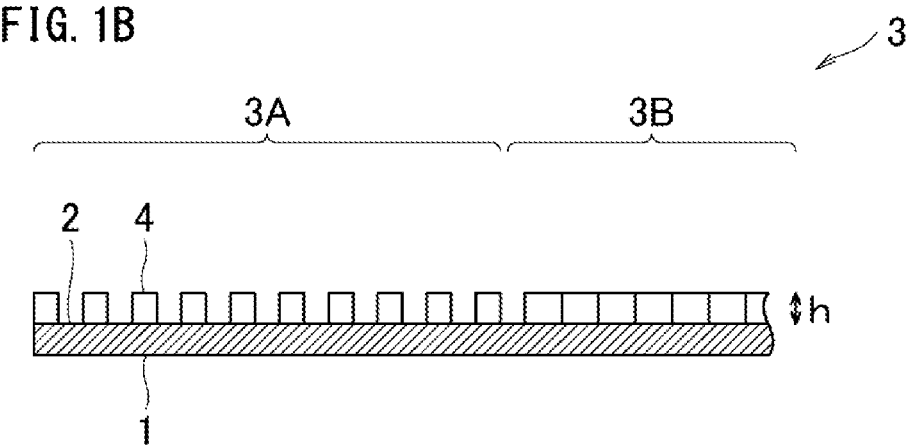
FIG. 1B is a front view of the reflective polarized-light separating diffraction-grating.

In the following, the configurations of the reflective polarized-light separating diffraction-element and the optical measurement device of the present invention are described in order with reference to the drawings. FIG. 1A is an overall structure diagram of a reflective polarized-light separating diffraction-grating according to a first embodiment, and FIG. 1B is a front view of the reflective polarized-light separating diffraction-grating.

The reflective polarized-light separating diffraction-grating comprises: a substrate 1 consisting of a metal material; a reflection surface 2 formed on a surface of the substrate 1; and a lattice structured body assembly 3 that is provided on the refection surface 2 and exhibits a form birefringence ($\Delta n^*$).

The lattice structured body assembly 3 consists of lattice structured bodies (3A, 3B, 3C and 3D) of a plurality of patterns having lattice structures of different azimuths (0°, +45°, +90° and +135°), and these lattice structured bodies (3A, 3B, 3C and 3D) of a plurality of patterns are aligned on the reflection surface 2 in the X-axis direction such that the azimuths of the lattice structures change in a structurally periodic manner. Here, the structural period aligning in the X-axis direction of the azimuth of the lattice structure may be discontinuous as shown in the drawing, or continuous. For example, a structural period that is trigonometrically continuous can also be achieved, such as liquid-crystal.

In the present embodiment, lattice structures of each pattern consist of parallel grooves. That is, a plurality of lattice members 4 that are light-transmitting dielectrics is aligned at a pitch of even intervals such as 100 nm, for example. The pitch of the lattice members 4 may be a half or less of a pitch of a wavelength of a measurement light (from ultraviolet light to infrared light) to be used. Moreover, the width in the X-axis direction in the lattice structures of each pattern is 1 µm; however, a range of about 0.5 to 2 µm is acceptable. Here, the height h of the lattice structure of the present invention corresponds to the depth of grooves shown in FIG. 1B, and the height h is 100 nm or greater, and preferably 300 nm or greater. The height h is preferably a height that is a half or greater of the wavelength of the measurement light to be used.

The longitudinal direction of the lattice member 4 is called as the "azimuth" herein. When the azimuth(0°) of the lattice structure of the pattern 3A is regarded as a reference, the azimuth of the pattern 3B is +45°, the azimuth of the pattern 3C is +90°, and the azimuth of the pattern 3D is +135°. The lattice members 4 have the same shape in any patterns and are aligned in the same way; however, only the azimuths are different in each pattern.

In FIG. 1, an example of a structural period (Λ) of the lattice structures of four patterns in total of which the azimuths of the lattice structures are in the order of 0°, +45°, +90°, +135°, and 0° is shown; however, it may be of three patterns, or five patterns or greater. Moreover, they may be aligned such that the structural period Λ repeats.

FIG. 2A to FIG. 2F are front views of the polarized-light separating diffraction-grating, and show variations of the polarized-light separating diffraction-grating of which the lattice structured body is formed on one surface. The member forming the reflection surface 2 is shown with a hatching in solid lines.

Figure 2A:
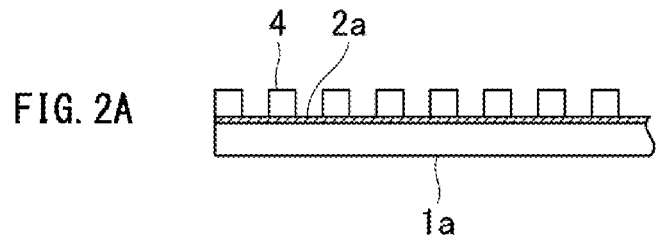
FIG. 2A to FIG. 2F are front views of the polarized-light separating diffraction-grating, and show variations of the polarized-light separating diffraction-grating to which a lattice structured body is formed on one surface.
Figure 2B:
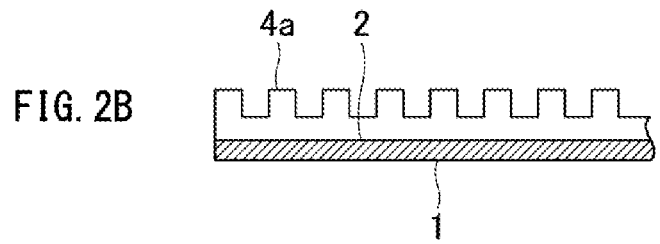
Figure 2C:
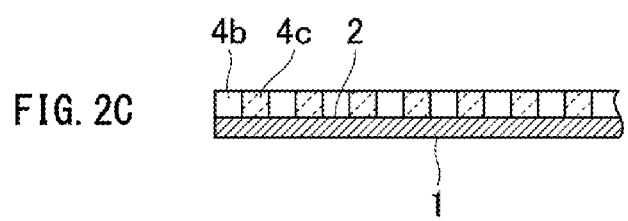
Figure 2D:
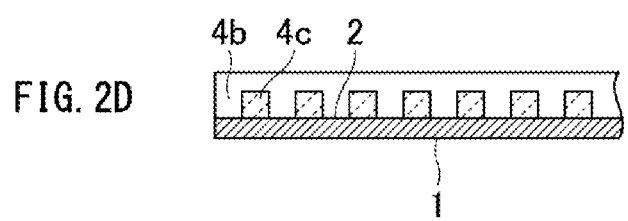

In FIG. 2A, a metal film 2a is formed on a surface of a substrate 1a, and the lattice members 4 are aligned on the metal film 2a. In FIG. 2B, an uneven structure 4a consisting of a light-transmitting dielectric is formed on the reflection surface 2 of a metal substrate 1. In FIG. 2C, not the uneven structure, but a lattice structured body configured by disposing two types of light-transmitting dielectrics (4b, 4c) having different refractive indices alternately is provided on the substrate 1. In FIG. 2D, a lattice structured body similar to FIG. 2C is provided on the substrate 1, and a layer of the light-transmitting dielectric 4d is further formed thereon. That is, the lattice structured body is provided inside the diffraction grating.

Figure 2E:
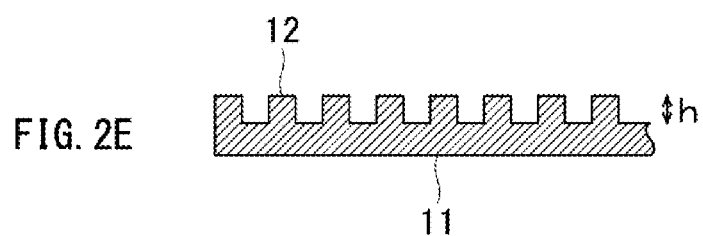
Figure 2F:
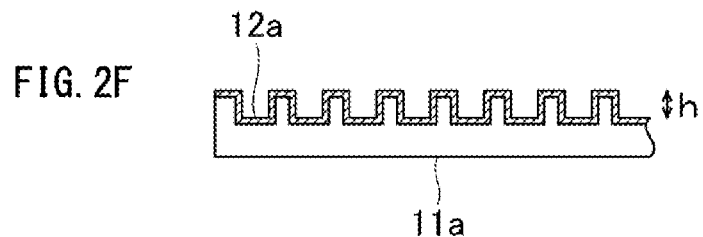
Figure 3A:
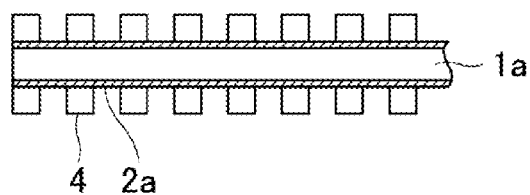
FIG. 3A to FIG. 3F are front views of the polarized-light separating diffraction-grating, and show variations of the polarized-light separating diffraction-grating to which lattice structured bodies are formed on both surfaces.
Figure 3B:
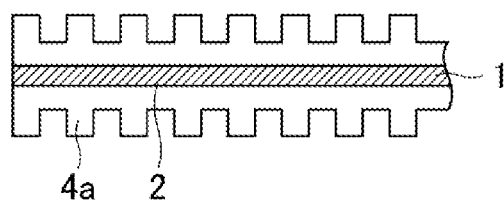
Figure 3C:
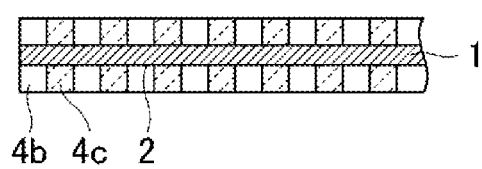
Figure 3D:
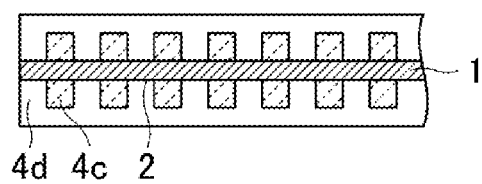
Figure 3E:
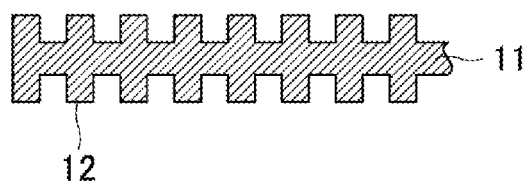
Figure 3F:
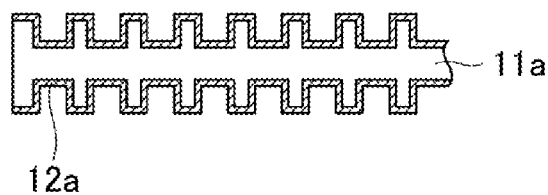

In FIG. 2E, a surface of a metal substrate 11 is formed unevenly, and a surface of unevenness is the reflection surface. That is, the reflective polarized-light separating diffraction-grating of FIG. 2E comprises a substrate 11, and a lattice uneven structured body assembly 12 that is formed on the surface of the substrate 11 and exhibits a form birefringence (Δn*). The uneven surface of the lattice uneven structured body assembly 12 is the reflection surface. The lattice uneven structured body assembly 12 consists of lattice uneven structured bodies of a plurality of patterns having lattice uneven structures of different azimuths, and these lattice uneven structured bodies of a plurality of patterns are aligned in a predetermined direction on the surface of the substrate 11 such that the azimuths of the lattice uneven structured bodies of a plurality of patterns change in a structurally periodic manner. In FIG. 2E, one of which a light-transmitting dielectric is laminated and configured in an uneven form may be used as the substrate 11. In FIG. 2F, a surface of a substrate 11a is formed unevenly like FIG. 2E, and a metal film 12a is formed on the uneven surface thereof.

FIG. 3A to FIG. 3F are front views of the polarized-light separating diffraction-grating, and show variations of the polarized-light separating diffraction-grating of which lattice structured bodies are formed on both surfaces. Same reference signs are used for the reference signs that are in common with FIG. 2A to FIG. 2F.

In the following, optical properties of the reflective polarized-light separating diffraction-grating of the present embodiment are described by using mathematical equations.

<Conventional Transmissive Polarized-Light Separating Diffraction-Element>

First, a case of a conventional transmissive polarized-light separating diffraction-element is described. The transmissive polarized-light separating diffraction-element consists of a lattice structure having a form birefringence (Δn*), a structural height h, and a structural period (Λ). When an optional polarized light is incident thereon, it has a property of separating the optional polarized light into a right-handed circularly-polarized light and a left-handed circularly-polarized light to diffract them in directions of +1 order and −1 order respectively.

A 2×2 matrix (Jones matrix) that expresses the property of the conventional transmissive polarized-light separating diffraction-element can be written as follows.

[Math. 1]
$$T(x) = \begin{pmatrix} \cos\left(\frac{-kx}{2}\right) & -\sin\left(\frac{-kx}{2}\right) \\ \sin\left(\frac{-kx}{2}\right) & \cos\left(\frac{-kx}{2}\right) \end{pmatrix} \cdot \begin{pmatrix} e^{i\zeta} & 0 \\ 0 & e^{-i\zeta} \end{pmatrix} \cdot \begin{pmatrix} \cos\left(\frac{kx}{2}\right) & -\sin\left(\frac{kx}{2}\right) \\ \sin\left(\frac{kx}{2}\right) & \cos\left(\frac{kx}{2}\right) \end{pmatrix} \quad (1)$$

Here, $k = \frac{2\pi}{\Lambda}, \zeta = \frac{\pi \Delta n^* h}{\lambda}$.

Equation (1) means that a phase of +ζ is imparted to a fast-axis direction component of the incident light, a phase of −ζ is imparted to a slow-axis direction component, and the azimuth of the fast axis of the element changes like −kx/2 (rotates for 180° at x=Λ) relative to the optical axis of the incident light.

Here, when considering that the right-handed circularly-polarized light is incident on the element as an incident light $E_{in}$, $T(x) \cdot E_{in}$ becomes as follows.

[Math. 2]
$$T(x) \cdot \frac{1}{\sqrt{2}}\begin{pmatrix} 1 \\ i \end{pmatrix} = \frac{\cos\zeta}{\sqrt{2}}\begin{pmatrix} 1 \\ i \end{pmatrix} + \frac{i\sin\zeta \cdot e^{-ikx}}{\sqrt{2}} \cdot \begin{pmatrix} 1 \\ -i \end{pmatrix} \quad (2)$$

By contrast, when considering that the left-handed circularly-polarized light is incident on the element, $T(x) \cdot E_{in}$ becomes as follows.

[Math. 3]
$$T(x) \cdot \frac{1}{\sqrt{2}}\begin{pmatrix} 1 \\ -i \end{pmatrix} = \frac{\cos\zeta}{\sqrt{2}}\begin{pmatrix} 1 \\ -i \end{pmatrix} + \frac{i\sin\zeta \cdot e^{ikx}}{\sqrt{2}} \cdot \begin{pmatrix} 1 \\ i \end{pmatrix} \quad (3)$$

Here, the optional polarized light can be represented as an overlap of the right-handed and left-handed circularly-polarized lights. When an amplitude of the right-handed circularly-polarized light is written as a and an amplitude of the left-handed circularly-polarized light is written as b, it becomes as the following equation. Here, a and b are defined such that a relationship of $a^2+b^2=1$ is satisfied.

[Math. 4]

$$E_{in} = \frac{a}{\sqrt{2}}\begin{pmatrix}1\\i\end{pmatrix} + \frac{b}{\sqrt{2}}\begin{pmatrix}1\\-i\end{pmatrix} \quad (4)$$

Therefore, with reference to Equations (2) and (3), $T(x) \cdot E_{in}$ is determined by using Equation (4) as follows.

[Math. 5]

$$T(x) \cdot E_{in} = \frac{a \cdot \cos\zeta}{\sqrt{2}}\begin{pmatrix}1\\i\end{pmatrix} + \frac{ia \cdot \sin\zeta \cdot e^{-ikx}}{\sqrt{2}}\begin{pmatrix}1\\-i\end{pmatrix} + \frac{b \cdot \cos\zeta}{\sqrt{2}}\begin{pmatrix}1\\-i\end{pmatrix} + \frac{ib \cdot \sin\zeta \cdot e^{ikx}}{\sqrt{2}}\begin{pmatrix}1\\i\end{pmatrix} = \cos\zeta \cdot E_{in} + \frac{ia \cdot \sin\zeta \cdot e^{-ikx}}{\sqrt{2}}\begin{pmatrix}1\\-i\end{pmatrix} + \frac{ib \cdot \sin\zeta \cdot e^{ikx}}{\sqrt{2}}\begin{pmatrix}1\\i\end{pmatrix} \quad (5)$$

Here, an m-order diffracted light vector $D_m$ is denoted by the following equation.

[Math. 6]

$$D_m = \frac{1}{\Lambda}\int_0^\Lambda T(x)E_{in}\exp\left(\frac{-i2\pi mx}{\Lambda}\right)dx \quad (6)$$

When Equation (5) is substituted to Equation (6), the following can be determined as a vector of a diffracted light of when the optional polarized light is incident on the polarized-light separating diffraction-element.

[Math. 7]

$$D_0 = \cos\zeta \quad (7)$$

$$D_{+1} = \frac{ib \cdot \sin\zeta}{\sqrt{2}}\begin{pmatrix}1\\i\end{pmatrix} \quad (8)$$

$$D_{-1} = \frac{ia \cdot \sin\zeta}{\sqrt{2}}\begin{pmatrix}1\\-i\end{pmatrix} \quad (9)$$

Here, from Equation (8), it is found that the +1 order diffracted light is a right-handed circularly-polarized light of an amplitude b·sin ζ. From Equation (9), it is found that the −1 order diffracted light is a left-handed circularly-polarized light of an amplitude a·sin. The diffracted-light intensity $\eta_m$ is given by $\eta_m=|D_m|^2/|E_{in}|^2$, and since it is $|E_{in}|^2=1$ from Equation (4),

[Math. 8]

$$\eta_0 = \cos^2\zeta = \cos^2\left(\frac{\pi\Delta n^* h}{\lambda}\right) \quad (10)$$

$$\eta_{+1} = b^2 \cdot \sin^2\zeta = b^2 \cdot \sin^2\left(\frac{\pi\Delta n^* h}{\lambda}\right) \quad (11)$$

-continued $$\eta_{-1} = a^2 \cdot \sin^2\zeta = a^2 \cdot \sin^2\left(\frac{\pi\Delta n^* h}{\lambda}\right) \quad (12)$$

it is determined as above.

Therefore, the ellipticity (e=b/a) of the incident light or a Stokes parameter $\langle S_3 \rangle$ can be calculated from the relationship of Equation (13) by measuring the intensities of $\eta_{\pm 1}$.

[Math. 9]

$$\langle S_3 \rangle = \frac{\eta_{+1} - \eta_{-1}}{\eta_{+1} + \eta_{-1}} = \frac{-(a^2 - b^2)}{a^2 + b^2} = \frac{e^2 - 1}{e^2 + 1} \quad (13)$$

Figure 6A:
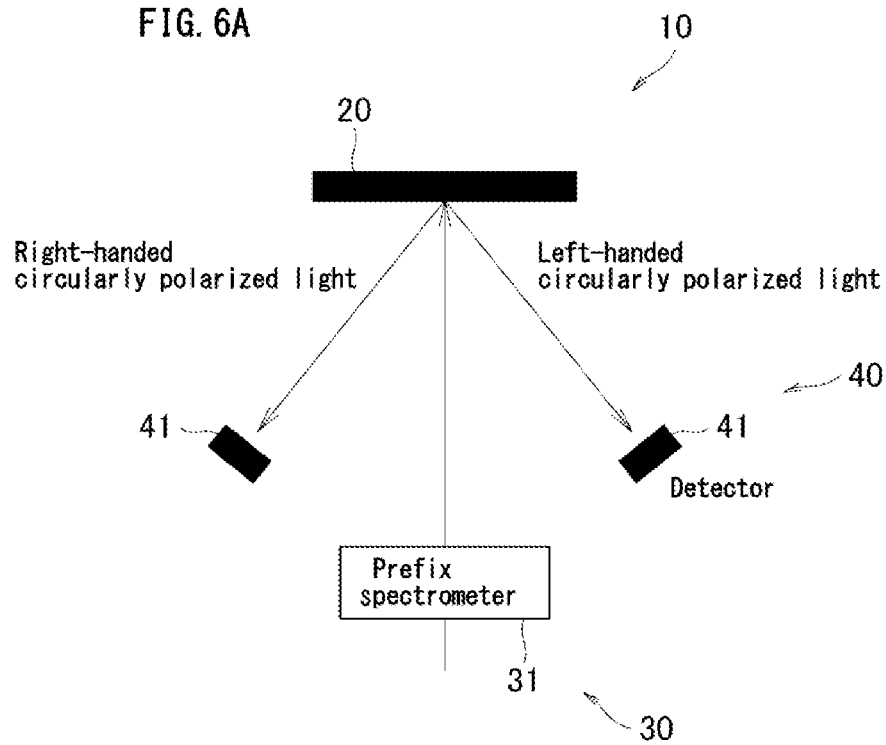
FIG. 6A is a diagram illustrating an overall structure of an optical measurement device according to a fourth embodiment.
Figure 6B:
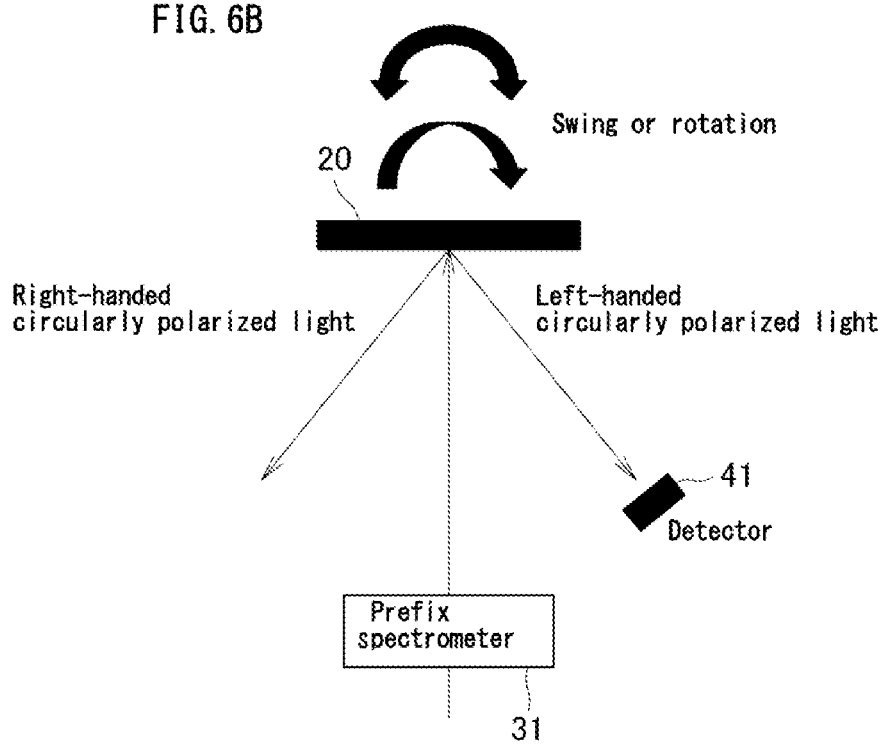
FIG. 6B is a diagram illustrating an overall structure of an optical measurement device according to a fifth embodiment.

As shown in FIG. 6B and FIG. 10 to be described later, rotating the optical element such as a diffraction grating at a specific frequency is one effective means for improving S/N. A transfer matrix T(x) of when the optical element rotates becomes as follows. Pre-multiplying the matrix T(x) of equation (1) with a rotation matrix R(θ) of angle θ and post-multiplying the matrix T(x) of equation (1) with a rotation matrix R(−θ) of angle −θ results in a matrix T(x) of equation (14).

[Math. 10]

$$T(x) = \begin{pmatrix}\cos\theta & -\sin\theta\\ \sin\theta & \cos\theta\end{pmatrix} \cdot \begin{pmatrix}\cos\left(\frac{-kx}{2}\right) & -\sin\left(\frac{-kx}{2}\right)\\ \sin\left(\frac{-kx}{2}\right) & \cos\left(\frac{-kx}{2}\right)\end{pmatrix} \cdot \begin{pmatrix}e^{i\zeta} & 0\\ 0 & e^{i\zeta}\end{pmatrix} \cdot \begin{pmatrix}\cos\left(\frac{-kx}{2}\right) & \sin\left(\frac{-kx}{2}\right)\\ -\sin\left(\frac{-kx}{2}\right) & \cos\left(\frac{-kx}{2}\right)\end{pmatrix} \cdot \begin{pmatrix}\cos(\theta) & -\sin(-\theta)\\ \sin(-\theta) & \cos(-\theta)\end{pmatrix} \quad (14)$$

First, when considering that the right-handed circularly-polarized light is incident on the element, $T(x) \cdot E_{in}$ becomes as follows.

[Math. 11]

$$T(x)\frac{1}{\sqrt{2}}\begin{pmatrix}1\\i\end{pmatrix} = \frac{\cos\zeta}{\sqrt{2}} \cdot \begin{pmatrix}1\\i\end{pmatrix} + \frac{i \cdot \sin\zeta \cdot e^{-ikx} \cdot e^{i2\theta}}{\sqrt{2}} \cdot \begin{pmatrix}1\\-i\end{pmatrix} \quad (15)$$

Likewise, when considering that the left-handed circularly-polarized light is incident on the element, $T(x) \cdot E_{in}$ becomes as follows.

[Math. 12]

$$T(x)\frac{1}{\sqrt{2}}\begin{pmatrix}1\\-i\end{pmatrix} = \frac{\cos\zeta}{\sqrt{2}} \cdot \begin{pmatrix}1\\-i\end{pmatrix} + \frac{i \cdot \sin\zeta \cdot e^{-ikx} \cdot e^{i2\theta}}{\sqrt{2}} \cdot \begin{pmatrix}1\\i\end{pmatrix} \quad (16)$$

Here, similar to Equation (4), when the optional polarized light is written as an overlap of the right- and left-handed circularly-polarized lights (an amplitude of the right-handed circularly-polarized light is written as a, and an amplitude of the left-handed circularly-polarized light is written as b: $a^2+b^2=1$: the following equation), $T(x) \cdot E_{in}$ is determined as follows.

[Math. 13]

$$E_{in} = \frac{a}{\sqrt{2}}\begin{pmatrix}1\\i\end{pmatrix} + \frac{b}{\sqrt{2}}\begin{pmatrix}1\\-i\end{pmatrix} \quad (4)$$

[Math. 14]

$$T(x)\cdot E_{in} = \cos\zeta \cdot E_{in} + \frac{ia\cdot\sin\zeta\cdot e^{-ikx}\cdot e^{i2\theta}}{\sqrt{2}}\begin{pmatrix}1\\-i\end{pmatrix} + \frac{ib\cdot\sin\zeta\cdot e^{-ikx}\cdot e^{i2\theta}}{\sqrt{2}}\begin{pmatrix}1\\i\end{pmatrix} \quad (17)$$

As shown in Equation (6), an m-order diffracted light vector $D_m$ is denoted by the following equation.

[Math. 15]

$$D_m = \frac{1}{\Lambda}\int_0^\Lambda T(x)E_{in}\exp\left(\frac{-i2\pi mx}{\Lambda}\right)dx \quad (6)$$

Therefore, the vector of the diffracted light of when the optional polarized light is incident on the polarized-light separating diffraction-element that rotates is determined as follows.

[Math. 16]

$$D_0 = \cos\zeta \quad (18)$$

$$D_{+1} = \frac{ib\cdot\sin\zeta\cdot e^{i2\theta}}{\sqrt{2}}\begin{pmatrix}1\\i\end{pmatrix} \quad (19)$$

$$D_{-1} = \frac{ia\cdot\sin\zeta\cdot e^{-i2\theta}}{\sqrt{2}}\begin{pmatrix}1\\-i\end{pmatrix} \quad (20)$$

Here, from Equation (19), it is found that the +1 order diffracted light is the right-handed circularly-polarized light having an amplitude of $b\cdot\sin\zeta\cdot e^{i2\theta}$. From Equation (20), it is found that the −1 order diffracted light is the left-handed circularly-polarized light having an amplitude of $a\cdot\sin\zeta\cdot e^{-i2\theta}$. The diffracted-light intensity $\eta_m$ is given by $\eta_m=|D_m|^2/|E_{in}|^2$, and, from Equation (4), since it is $|E_{in}|^2=1$ and

[Math. 17]

$$\left|\frac{e^{i2\theta}}{\sqrt{2}}\begin{pmatrix}1\\\pm i\end{pmatrix}\right|^2 = 1$$

the results identical to Equations (10) to (12) can be acquired like Equations (21) to (23).

[Math. 18]

$$\eta_0 = \cos^2\zeta = \cos^2\left(\frac{\pi\Delta n^* h}{\lambda}\right) \quad (21)$$

$$\eta_{+1} = b^2\cdot\sin^2\zeta = b^2\cdot\sin^2\left(\frac{\pi\Delta n^* h}{\lambda}\right) \quad (22)$$

$$\eta_{-1} = a^2\cdot\sin^2\zeta = a^2\cdot\sin^2\left(\frac{\pi\Delta n^* h}{\lambda}\right) \quad (23)$$

It is determined as shown. Therefore, the ellipticity (e=b/a) of the incident light or a Stokes parameter<$S_3$> can be determined from the relationship of Equation (13) by measuring the intensities of $\eta_{\pm 1}$.

<Reflective Polarized-Light Separating Diffraction-Element>

Based on the point of view regarding the properties of the above-described transmissive diffraction-grating (polarized-light separating diffraction-element), if the following arrangement is made, a reflective polarized-light separating diffraction-element can be used as a polarized-light separating diffraction-element that functions under the arrangement of the reflection system in the layout. In the following, functions of the reflective polarized-light separating diffraction-element including difference between the transmissive type are described.

(A) Case of providing a reflective metal surface directly under the structure of the transparent dielectric:

A transfer matrix that represents reflection of a light incident on a metal surface (e.g., the metal film $2a$ of the polarized-light separating diffraction-grating of FIG. 2A) at 0° (perpendicularly) is written as follows.

[Math. 19]

$$R_m = \begin{pmatrix}\cos\left(\frac{-kx}{2}\right) & -\sin\left(\frac{-kx}{2}\right)\\\sin\left(\frac{-kx}{2}\right) & \cos\left(\frac{-kx}{2}\right)\end{pmatrix}\cdot\begin{pmatrix}r_{TM} & 0\\0 & r_{TE}\end{pmatrix}\cdot\begin{pmatrix}\cos\left(\frac{kx}{2}\right) & -\sin\left(\frac{kx}{2}\right)\\\sin\left(\frac{kx}{2}\right) & \cos\left(\frac{kx}{2}\right)\end{pmatrix} = \quad (24)$$

$$\begin{pmatrix}\cos\left(\frac{-kx}{2}\right) & -\sin\left(\frac{-kx}{2}\right)\\\sin\left(\frac{-kx}{2}\right) & \cos\left(\frac{-kx}{2}\right)\end{pmatrix}\cdot$$

$$\begin{pmatrix}\frac{n_\perp^* - n_M^*}{n_\perp^* + n_M^*} & 0\\0 & \frac{n_\parallel^* - n_M^*}{n_\parallel^* + n_M^*}\end{pmatrix}\cdot\begin{pmatrix}\cos\left(\frac{kx}{2}\right) & -\sin\left(\frac{kx}{2}\right)\\\sin\left(\frac{kx}{2}\right) & \cos\left(\frac{kx}{2}\right)\end{pmatrix}$$

Here, $n_\parallel^*, n_\perp^*$ are components (in directions parallel to and perpendicular to the structure) of a complex refractive index of the transparent dielectric (lattice member 4), and $n_M^*$ is a complex refractive index of the metal.

An m-order diffracted light vector $D'_m$ is denoted by the following equation.

[Math. 20]

$$D'_m = \frac{1}{\Lambda}\int_0^\Lambda T'(x)E_m\exp\left(\frac{-i2\pi mx}{\Lambda}\right)dx \quad (25)$$

Here, when considering of propagation of light at (A) "the polarized-light separating diffraction-element having the reflective metal surface provided directly under the structure of the transparent dielectric", it happens in the order of "element transmission $T_{in}(x)$", "metal reflection $R_M$", and "element transmission $T_{out}(x)$", T'(x) is given by the following equation.

[Math. 21]

$$T'(x) = T(x)R_m\cdot T(x) \quad (26)$$

Therefore, similar to Equation (4), when the optional polarized light is an overlap of the right- and left-handed circularly-polarized lights (an amplitude of the right-handed circularly-polarized light is a, and an amplitude of the left-handed circularly-polarized light is b: $a_2+b_2=1$), $T'(x) \cdot E_{in}$ is determined as follows.

[Math. 22]

$$T'(x) \cdot E_{in} = \begin{pmatrix} \cos\left(\frac{kx}{2}\right) & -\sin\left(\frac{kx}{2}\right) \\ \sin\left(\frac{kx}{2}\right) & \cos\left(\frac{kx}{2}\right) \end{pmatrix} \cdot \begin{pmatrix} e^{i\zeta} & 0 \\ 0 & e^{-i\zeta} \end{pmatrix} \cdot$$

$$\begin{pmatrix} \cos\left(\frac{-kx}{2}\right) & -\sin\left(\frac{-kx}{2}\right) \\ \sin\left(\frac{-kx}{2}\right) & \cos\left(\frac{-kx}{2}\right) \end{pmatrix} \cdot \begin{pmatrix} \cos\left(\frac{-kx}{2}\right) & -\sin\left(\frac{-kx}{2}\right) \\ \sin\left(\frac{-kx}{2}\right) & \cos\left(\frac{-kx}{2}\right) \end{pmatrix} \cdot$$

$$\begin{pmatrix} r_{TM} & 0 \\ 0 & r_{TE} \end{pmatrix} \cdot \begin{pmatrix} \cos\left(\frac{kx}{2}\right) & -\sin\left(\frac{kx}{2}\right) \\ \sin\left(\frac{kx}{2}\right) & \cos\left(\frac{kx}{2}\right) \end{pmatrix} \cdot \begin{pmatrix} \cos\left(\frac{-kx}{2}\right) & -\sin\left(\frac{-kx}{2}\right) \\ \sin\left(\frac{-kx}{2}\right) & \cos\left(\frac{-kx}{2}\right) \end{pmatrix} \cdot$$

$$\begin{pmatrix} e^{i\zeta} & 0 \\ 0 & e^{-i\zeta} \end{pmatrix} \cdot \begin{pmatrix} \cos\left(\frac{kx}{2}\right) & -\sin\left(\frac{kx}{2}\right) \\ \sin\left(\frac{kx}{2}\right) & \cos\left(\frac{kx}{2}\right) \end{pmatrix} \cdot \begin{pmatrix} \frac{(a+b)}{\sqrt{2}} \\ \frac{i(a-b)}{\sqrt{2}} \end{pmatrix} =$$

$$\frac{1}{2\sqrt{2}} \begin{pmatrix} -\frac{1}{2} \cdot (a-b) \cdot \sin(2kx) \cdot \sin(2\zeta) \cdot (r_{TE} - r_{TM}) + \\ (a+b) \cdot \cos(kx) \cdot \cos(2\zeta) \cdot \{-(r_{TE} - r_{TM}) + \\ \cos(kx) \cdot (r_{TE} + r_{TM})\} + \\ i \cdot [(a-b) \cdot \sin(kx) \cdot \{(r_{TE} - r_{TM}) + 2 \cdot \\ \cos(kx) \cdot \sin^2\zeta \cdot (r_{TE} + r_{TM})\} - \\ i \cdot (a+b) \cdot \cos(kx) \cdot [\sin(2\zeta) \cdot \{-(r_{TE} + r_{TM}) + \\ \cos(kx) \cdot (r_{TE} - r_{TM})\} + \\ \sin^2(kx) \cdot (r_{TE} + r_{TM})] \\ (a+b) \cdot \sin(kx) \cdot \{(r_{TE} - r_{TM}) - 2 \cdot \\ \cos(kx) \cdot \sin^2\zeta \cdot (r_{TE} + r_{TM})\} + \\ (a-b) \cdot \cos(kx) \cdot [\sin(2\zeta) \cdot \{-(r_{TE} + r_{TM}) + \\ \cos(kx) \cdot (r_{TE} - r_{TM})\} + \sin^2(kx) \cdot (r_{TE} + r_{TM})] + \\ \frac{1}{2} \cdot i \cdot (a+b) \cdot \sin(2kx) \cdot \sin(2\zeta) \cdot (r_{TE} - r_{TM}) \\ i \cdot (a-b) \cdot \cos(kx) \cdot \cos(2\zeta) \cdot \{(r_{TE} - r_{TM}) + \\ \cos(kx) \cdot (r_{TE} + r_{TM})\} + \end{pmatrix}$$

When Equation (27) is substituted to Equation (25) to determine each $D'_m$ and $\eta'_m$, a 0 order light becomes:

[Math. 23]

$$D'_0 = \frac{1}{2\sqrt{2}} \cdot \cos\zeta \cdot \{\cos\zeta \cdot (r_{TE} + r_{TM}) - i \cdot \sin\zeta \cdot (r_{TE} - r_{TM})\} \cdot \begin{pmatrix} a+b \\ i(a-b) \end{pmatrix} \quad (28)$$

and the polarization state of the 0 order diffracted light can be confirmed to be the same as the incident light. Moreover, the diffraction efficiency of the 0 order light becomes the following equation.

[Math. 24]

$$\eta'_0 = \frac{1}{4}\cos^2\zeta \cdot Re\left[r_{TE}^2 + r_{TM}^2 - 2r_{TE} \cdot r_{TM} \cdot \cos(2\zeta)\right] \quad (29)$$

Next, the vector of the +1 order diffracted light becomes:

[Math. 25]

$$D'_{+1} = \frac{1}{4\sqrt{2}} \cdot \begin{pmatrix} \{-(a-b) + (a+b) \cdot \cos(2\zeta)\} \cdot (r_{TE} - r_{TM}) + \\ i \cdot (a+b) \cdot \sin(2\zeta) \cdot (r_{TE} + r_{TM}) \\ i \cdot [\{-(a+b) + (a-b) \cdot \cos(2\zeta)\} \cdot (r_{TE} - r_{TM}) - i \cdot \\ (a-b) \cdot \sin(2\zeta) \cdot (r_{TE} + r_{TM})] \end{pmatrix} \quad (30)$$

and the polarization state of the +1 order diffracted light can be confirmed to be one of which the left-handed circularly-polarized light is overlapped with the right-handed circularly-polarized light. Moreover, the diffraction efficiency becomes as follows.

[Math. 26]

$$\eta'_{+1} = Re\left[\frac{1}{16} \cdot \left[(r_{TE} - r_{TM})^2 \cdot \{\cos^2(2\zeta) - 2 \cdot (a^2 - b^2) \cdot \cos(2\zeta) + 1\} + (r_{TE} + r_{TM})^2 \cdot \sin^2(2\zeta)\right]\right] \quad (31)$$

Moreover, the vector of the −1 order light becomes:

[Math. 27]

$$D'_{-1} = \frac{1}{4\sqrt{2}} \cdot \begin{pmatrix} -\{(a-b) + (a+b) \cdot \cos(2\zeta)\} \cdot (r_{TE} - r_{TM}) + \\ i \cdot (a+b) \cdot \sin(2\zeta) \cdot (r_{TE} + r_{TM}) \\ i \cdot [\{(a+b) + (a-b) \cdot \cos(2\zeta)\} \cdot (r_{TE} - r_{TM}) - i \cdot \\ (a-b) \cdot \sin(2\zeta) \cdot (r_{TE} + r_{TM})] \end{pmatrix} \quad (32)$$

and the polarization state of the −1 order diffracted light can be confirmed to be one of which the right-handed circularly-polarized light is overlapped with the left-handed circularly-polarized light. Moreover, the diffraction efficiency becomes as follows.

[Math. 28]

$$\eta'_{-1} = Re\left[\frac{1}{16} \cdot \left[(r_{TE} - r_{TM})^2 \cdot \{\cos^2(2\zeta) + 2 \cdot (a^2 - b^2) \cdot \cos(2\zeta) + 1\} + (r_{TE} + r_{TM})^2 \cdot \sin^2(2\zeta)\right]\right] \quad (33)$$

Therefore, similar to the case of the transmissive element, it is considered that the ellipticity (e=b/a) of the incident light or a Stokes parameter $<S_3>$ can be determined from the relationship of the following Equation (34) by measuring the intensities of $\eta_{\pm 1}$. However, $r_{TE}$, $r_{TM}$ and $\zeta$ that are property values of the metal layer and the phase-imparting layer are needed for the calculation.

[Math. 29]

$$\langle S_3 \rangle = \frac{\eta_{+1} - \eta_{-1}}{\eta_{+1} + \eta_{-1}} = \frac{(a^2 - b^2) \cdot \cos(2\zeta) \cdot (r_{TE} - r_{TM})^2}{3 \cdot (r_{TE}^2 + r_{TM}^2) - r_{TE} \cdot r_{TM} \cdot \{\cos(4\zeta) + 2\}} \quad (34)$$

(B) Case of which the structure of the lattice structured body is formed with a metal:

Furthermore, a case of which the structure of the lattice structured body is formed with a metal (e.g., the lattice uneven structured body assembly 12 of FIG. 2E) is considered. When propagation of light at the element of (B) is considered, since it happens in the order of "phase impartation by unevenness" and "metal reflection", T"(x) is given by the following equation.

[Math. 30]

$$T''(x) = R_M \cdot T(x) \quad (35)$$

Therefore, similar to the case of (A), T"(x)·$E_{in}$ of when an optional polarized light is incident on the element is determined as follows.

[Math. 31]

$$T''(x) \cdot E_{in} = \quad (36)$$

$$\begin{pmatrix} \frac{1}{2}\{(1+\cos kx) \cdot e^{i\zeta} \cdot r_{TM} + (1-\cos kx) \cdot e^{-i\zeta} \cdot r_{TE}\} & -\frac{\sin kx}{2} \cdot (e^{i\zeta} \cdot r_{TM} - e^{-i\zeta} \cdot r_{TE}) \\ -\frac{\sin kx}{2} \cdot (e^{i\zeta} \cdot r_{TM} - e^{-i\zeta} \cdot r_{TE}) & \frac{1}{2}\{(1+\cos kx) \cdot e^{i\zeta} \cdot r_{TM} + (1-\cos kx) \cdot e^{-i\zeta} \cdot r_{TE}\} \end{pmatrix} \cdot \begin{pmatrix} \frac{(a+b)}{\sqrt{2}} \\ \frac{i(a-b)}{\sqrt{2}} \end{pmatrix}$$

When Equation (36) is used to determine each D'm and η'$_m$, the 0 order light becomes:

[Math. 32]

$$D'_0 = \frac{\{\cos(\zeta) \cdot (r_{TE} + r_{TM}) - i \cdot \sin(\zeta) \cdot (r_{TE} - r_{TM})\}}{4} \cdot \begin{pmatrix} a+b \\ i \cdot (a-b) \end{pmatrix} \quad (37)$$

and the polarization state of the 0 order diffracted light can be confirmed to be the same as the incident light. Moreover, the diffraction efficiency of the 0 order light can be shown as follows.

[Math. 33]

$$\eta'_0 = \frac{(a^2+b^2)}{8} \cdot (r_{TE}^2 + r_{TM}^2 + 2 \cdot r_{TE} \cdot r_{TM} \cdot \cos 2\zeta) \quad (38)$$

Next, the vector of the +1 order diffracted light becomes:

[Math. 34]

$$D'_{+1} = \frac{-b}{4} \cdot \begin{pmatrix} \cos(\zeta) \cdot (r_{TE} - r_{TM}) - i \cdot \sin(\zeta) \cdot (r_{TE} + r_{TM}) \\ i \cdot \{\cos(\zeta) \cdot (r_{TE} - r_{TM}) - i \cdot \sin(\zeta) \cdot (r_{TE} - r_{TM})\} \end{pmatrix} = \quad (39)$$

$$\frac{-b}{4} \cdot \{\cos(\zeta) \cdot (r_{TE} - r_{TM}) - i \cdot \sin(\zeta) \cdot (r_{TE} + r_{TM})\} \cdot \begin{pmatrix} 1 \\ i \end{pmatrix}$$

and the polarization state of the +1 order diffracted light can be confirmed to be a right-handed circularly-polarized light. Moreover, the diffraction efficiency becomes as follows.

[Math. 35]

$$\eta'_{+1} = \frac{b^2}{8} \cdot (r_{TE}^2 + r_{TM}^2 - 2 \cdot r_{TE} \cdot r_{TM} \cdot \cos 2\zeta) \quad (40)$$

The vector of the −1 order diffracted light and the diffraction efficiency become:

[Math. 36]

$$D'_{-1} = \frac{-a}{4} \cdot \begin{pmatrix} \cos(\zeta) \cdot (r_{TE} - r_{TM}) - i \cdot \sin(\zeta) \cdot (r_{TE} + r_{TM}) \\ -i \cdot \{\cos(\zeta) \cdot (r_{TE} - r_{TM}) - i \cdot \sin(\zeta) \cdot (r_{TE} + r_{TM})\} \end{pmatrix} = \quad (41)$$

$$\frac{-a}{4} \cdot \{\cos(\zeta) \cdot (r_{TE} - r_{TM}) - i \cdot \sin(\zeta) \cdot (r_{TE} + r_{TM})\} \cdot \begin{pmatrix} 1 \\ -i \end{pmatrix}$$

and the polarization state of the −1 order light can be confirmed to be a left-handed circularly-polarized light. Moreover, the diffraction efficiency becomes as follows.

[Math. 37]

$$\eta'_{-1} = \frac{a^2}{8} \cdot (r_{TE}^2 + r_{TM}^2 - 2 \cdot r_{TE} \cdot r_{TM} \cdot \cos 2\zeta) \quad (42)$$

Therefore, similar to the case of the transmissive element, the ellipticity (e=b/a) of the incident light or a Stokes parameter<$S_3$> can be determined from the relationship of Equation (13) by measuring the intensities of η$_{±1}$ in the case of the element of (B).

From the above explanations by Equations (1) to (42), (1) When a polarized light is incident on a polarized-light separating diffraction-element prepared with a transparent dielectric, a transmitted diffracted light thereof is separated into a right-handed circularly-polarized light (+1 order diffracted light) and a left-handed circularly-polarized light (−1 order diffracted light); therefore, an ellipticity of the incident light and a Stokes parameter<$S_3$> that shows the difference between amplitudes of the right- and left-handed circularly-polarized lights can be determined by measuring the intensities of the ±1 order diffracted lights. However, its property does not change even when the element is rotated. This means that, by performing a lock-in detection synchronized with rotation of the element, further improvement in S/N can be expected, but types of information acquired by rotation of the element do not increase. In that sense, a similar effect can be achieved not by rotating the element, but by simply chopping the incident light.

(2) When an element of which a fine structure of a transparent dielectric is imparted on a metal thin film, or an element of which a fine structure is directly processed on a metal thin film is used as a reflective element, an ellipticity of the incident light and a Stokes parameter<$S_3$> can be determined by a method of measuring the intensities of the ±1 order diffracted lights like the case of the above-described transmissive element (1).

(3) In a case of the reflective element of the above-described (2), a further improvement in S/N can be expected by performing a lock-in detection synchronized with rotation of the element. A similar effect can be achieved not by rotating the element, but by simply chopping the incident light.

Figure 4:
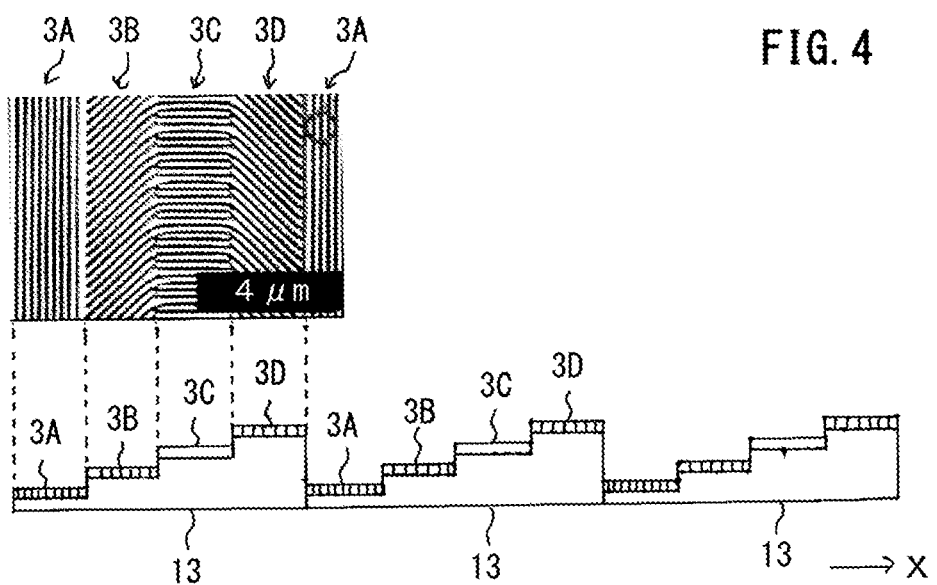
FIG. 4 is a front view of a reflective polarized-light separating diffraction-grating having a blazed structure according to a second embodiment, and a plane view of a part thereof.

FIG. 4 is an overall structure of a reflective polarized-light separating diffraction-grating having a blazed structure according to a second embodiment, and is a front view and a partial plane view thereof.

Similar to the polarized-light separating diffraction-grating of FIG. 1, the polarized-light separating diffraction-grating of the present embodiment comprises: a substrate 13 consisting of a metal material; a reflection surface formed on a surface of the substrate 13; and lattice structured bodies (3A, 3B, 3C and 3D) of four patterns that are provided on the reflection surface and exhibits a form birefringence (Δn*). That is, as shown in the plane view in the upper part of FIG. 4, the lattice structured bodies (3A, 3B, 3C and 3D) of four patterns are aligned periodically in the X-axis direction on a lattice surface of this polarized-light separating diffraction-grating like in the polarized-light separating diffraction-grating of FIG. 1.

Whereas, as shown in the plane view in the lower part of FIG. 4, the point different from the polarized-light separating diffraction-grating of FIG. 1 is that the surface of the substrate 13 is formed in a stepped form of four steps along the X-axis direction, and each step is provided with lattice structured bodies (3A, 3B, 3C or 3D) of different patterns respectively. In this way, in the present embodiment, the lattice structured bodies (3A, 3B, 3C or 3D) of four patterns are formed in a stepped form in accordance with the stepped-form structure of the surface of the substrate 13.

Moreover, the polarized-light separating diffraction-grating having the stepped-form structure that consists of four steps as one unit is planarly and repetitively aligned in the X-axis direction, so that the reflective polarized-light separating diffraction-grating having a blazed structure as a whole is formed. In other words, the reflective polarized-light separating diffraction-grating of the present embodiment is formed such that the stepped-form structure of the surface of the substrate 13 is repeated in accordance with a structurally periodic change of the azimuths of the lattice structured bodies (3A, 3B, 3C and 3D) of four patterns.

The height h of the lattice structure (depth of the groove) is the same in the lattice structured bodies (3A, 3B, 3C and 3D) of any pattern.

The reflection surface 2 in the present embodiment is not limited to the structure of FIG. 1, and various structures as shown in FIG. 2 are applicable. Moreover, in FIG. 4, the surfaces on the incident side of each substrate 13 are formed in stepped forms, and the bottom surfaces of the substrates 13 are formed as one plane; however, it is not limited thereto, and the stepped-form lattice structured bodies (3A, 3B, 3C and 3D) may be formed on both surfaces of the substrate 13 as shown in FIG. 3.

According to the reflective polarized-light separating diffraction-grating of the present embodiment, the diffracted-light intensity of a desired diffraction order such as +1 order (or −1 order) can be increased by weakening the 0 order diffracted light by the blazed structure thereof. Accordingly, by using the measurement device comprising such reflective polarized-light separating diffraction-grating, a weaker signal can be detected and S/N of a detected signal can be increased.

Figure 5:
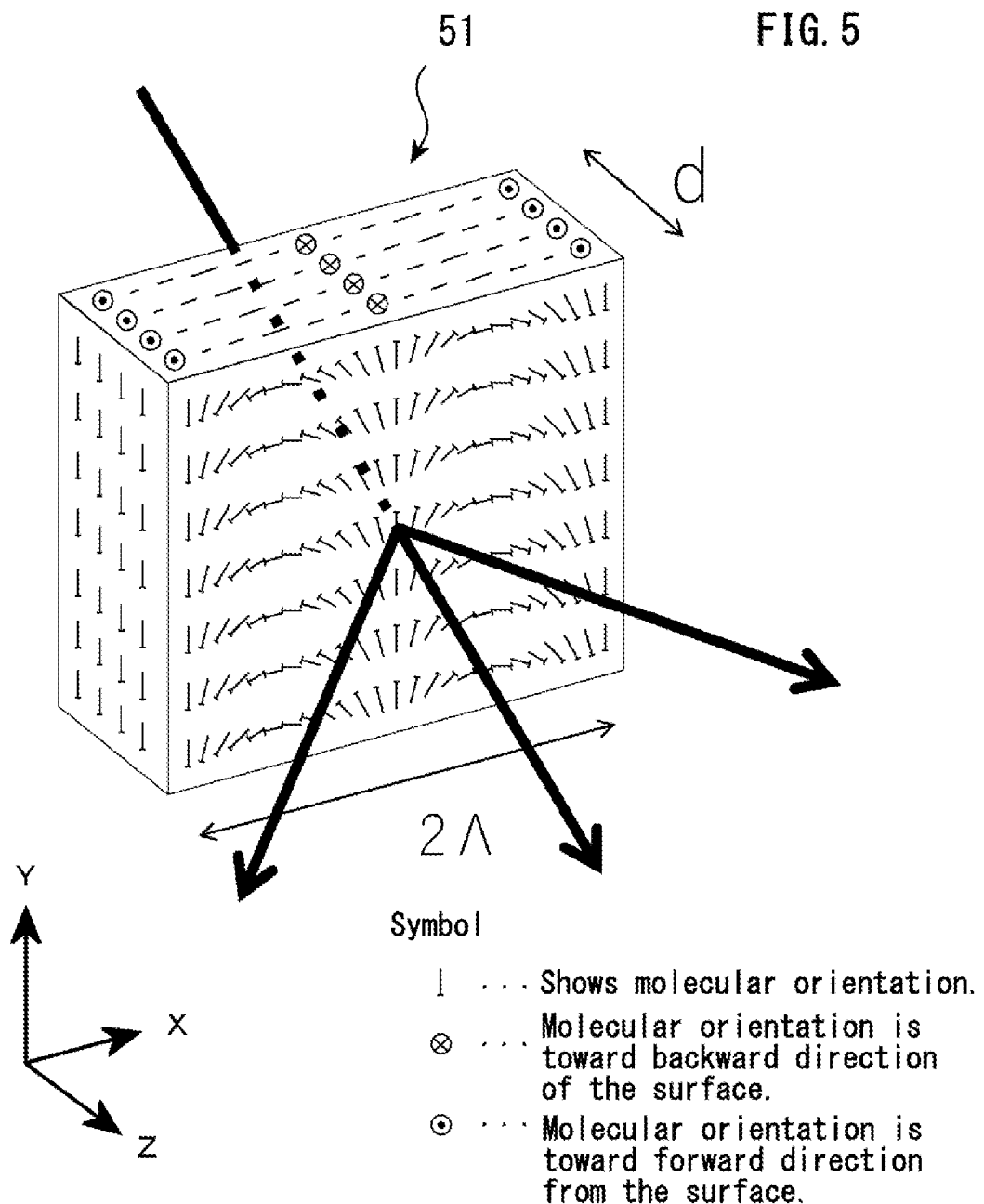
FIG. 5 is a three-dimensional view of a liquid-crystal birefringent structured body applicable to a reflective polarized-light separating diffraction-element according to a third embodiment.

FIG. 5 is a three-dimensional view of a liquid-crystal birefringent-structured body applicable to the reflective polarized-light separating diffraction-element according to a third embodiment.

Although not shown, the reflective polarized-light separating diffraction-element of the present embodiment comprises: a substrate; a reflection surface formed on a surface of the substrate; and a plurality of liquid-crystal birefringent structured bodies 51 aligned in a predetermined direction on this reflection surface.

The liquid-crystal birefringent structured body 51 has a plate form as shown in FIG. 5, and the reflection surface is formed on either surface of the front and back surfaces (X-Y plane). This birefringent structured body 51 has a large number of liquid-crystal molecules (also called as birefringent portion) disposed in one segment, and the liquid-crystal molecules are aligned along the X-axis direction such that an orientation of the optical axis of birefringence of each liquid-crystal molecule continuously change for 360 degrees within a plane parallel to the reflection surface. Here, the orientation of the optical axis shows the direction of molecular orientation of the liquid-crystal molecule, and the periodic change of molecular orientation of the birefringent structured body 51 is two times of the structural period (Λ) of the lattice structure like FIG. 1.

The symbols in the drawing show the orientations of the optical axes of the liquid-crystal molecules. When describing along the X-axis direction, the orientations of the optical axes of the liquid-crystal molecules in the segment are: toward the positive direction (upward) of the Y-axis at the left end region of the X-axis; toward the negative direction (downward) of the Y-axis at the center of the X-axis; and toward the positive direction (upward) of the Y-axis again at the right end region of the X-axis. That is, the liquid-crystal molecules at both ends of the segment are toward the same direction.

The optical axes of the liquid-crystal molecules distributed in the Y-Z plane perpendicular to the X-axis are all toward the same direction.

In the region from the left end to the center of the X-axis, the orientations of the optical axes continuously change from upward to downward. In the region from the center to the right end of the X-axis, the orientations of the optical axes continuously change from downward to upward. The thickness d of the birefringent structured body 51 is within a range of several micrometers to several tens of micrometers.

As shown in FIG. 5, the property of the birefringent-structured body 51 alone is that the incident light from the back surface transmits the birefringent structured body 51, so that the right-handed circularly-polarized light contained in the incident light becomes the +1 order diffracted light, and the left-handed circularly-polarized light contained in the incident light becomes the −1 order diffracted light; therefore, it has a good polarized-light separation property.

In this way, in the reflective polarized-light separating diffraction-element of the present embodiment, a plurality of birefringent structured bodies 51 aligned on the reflection surface is used. In one segment of the birefringent structured body 51, a large number of liquid-crystal molecules (birefringent portion) are disposed, and the orientations of the optical axes of birefringence of the liquid-crystal molecules continuously change along the X-axis; therefore, S/N thereof is significantly improved by the measurement device using the reflective polarized-light separating diffraction-element of the present embodiment. This is because the smaller the difference between the orientations of the optical axes of birefringence of the adjacent liquid-crystal elements is, the polarized-light separation property of the diffraction element improves.

It is not limited to the polarized-light separating diffraction-grating using molecular orientation. A similar effect can be achieved in a polarized-light separating diffraction-element of which birefringent portions other than liquid-crystal molecules are used and disposed such that the orientations of the optical axes of birefringence change continuously.

Next, a configuration of an optical measurement device (e.g., a circular dichroism measurement device or a birefringence measurement device) comprising the reflective polarized-light separating diffraction-grating of the present embodiment is described. FIG. 6A is an overall configuration of an optical measurement device according to a fourth embodiment.

As shown in FIG. 6A, an optical measurement device 10 comprises a reflective polarized-light separating diffraction-grating 20, an incident optical means 30, and a detection optical means 40. The incident optical means 30 is an optical equipment comprising a prefix spectrometer 31. The incident optical means 30 selects a light of a predetermined wavelength from a measurement light that comes from a light source (e.g., a deuterium lamp that emits an ultraviolet light having a wavelength region of 185 to 360 nm) at the prefix spectrometer 31, and makes the light incident on the reflective polarized-light separating diffraction-grating 20 as the measurement light having a uniform phase of the predetermined wavelength. When a measurement target is disposed on the optical path between the prefix spectrometer 31 and the polarized-light separating diffraction-grating 20, the measurement light from the prefix spectrometer 31 is incident on the reflective polarized-light separating diffraction-grating 20 after the polarization state is changed by optical properties (such as circular dichroism (CD), linear dichroism (LD), circularly-polarized birefringence (CB), or linearly-polarized birefringence (LB)) of the measurement target.

The detection optical means 40 comprises two detectors 41, and these detectors are disposed in the directions of the ±1 order diffracted lights from the reflective polarized-light separating diffraction-grating 20 to detect the ±1 order diffracted lights. When the measurement target is disposed on the optical path of the detection optical means 40, the ±1 order diffracted lights are detected after the polarization state is changed by birefringence of the measurement target.

FIG. 6B is an overall configuration of an optical measurement device according to a fifth embodiment. By providing a means for rotating or swinging the reflective polarized-light separating diffraction-grating 20, the detected signal changes periodically. Accordingly, high-sensitivity measurement using a detection means such as a lock-in amplifier can be performed even when a signal is weak such as circular dichroism.

Moreover, the reflective polarized-light separating diffraction-grating 20 of FIG. 6B is one of which a lattice structured body is formed on one side; however, it may be exchanged to one of which lattice structured bodies are formed on both surfaces. For example, at a timing when the front surface of the polarized-light separating diffraction-grating that rotates faces front toward the detector 41 provided only in the direction of the +1 order diffracted light of the optical measurement device of FIG. 6B, the left-handed circularly-polarized light may be incident on the detector 41; and at a timing when the back surface faces front, the right-handed circularly-polarized light may be incident on the detector 41. In this way, by using both surfaces of the reflective polarized-light separating diffraction-grating, optical properties such as circular dichroism can be measured with high sensitivity at high speed. Likewise, when measuring linear dichroism, a P polarized light may be incident on the detector 41 from the front surface of the polarized-light separating diffraction-grating, and an S polarized light may be incident on the detector 41 from the back surface.

Figure 7A:
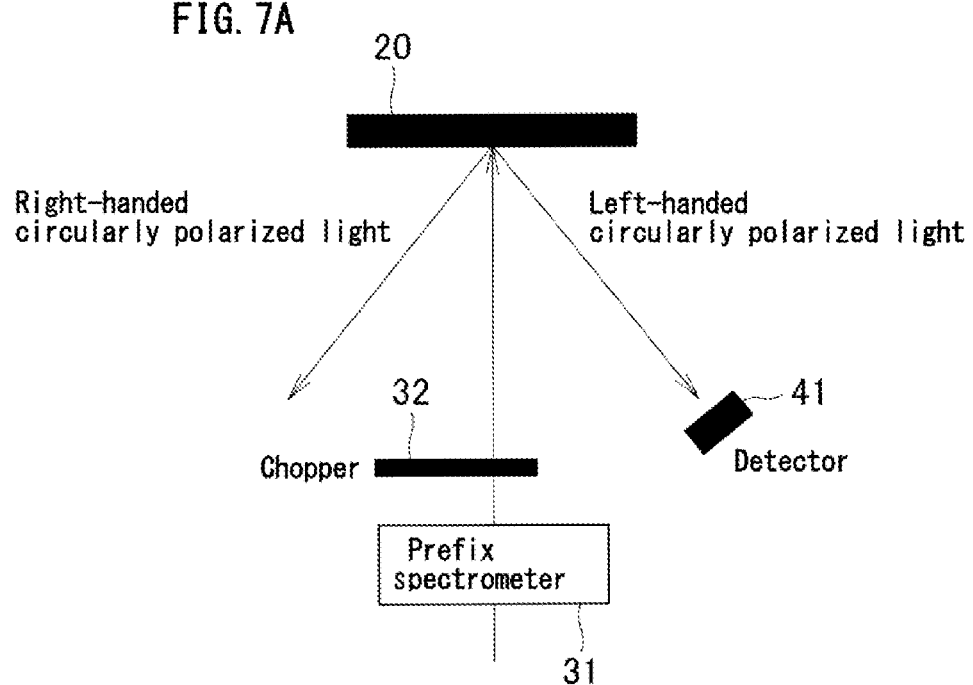
FIG. 7A is a diagram illustrating an overall structure of an optical measurement device according to a sixth embodiment.
Figure 7B:
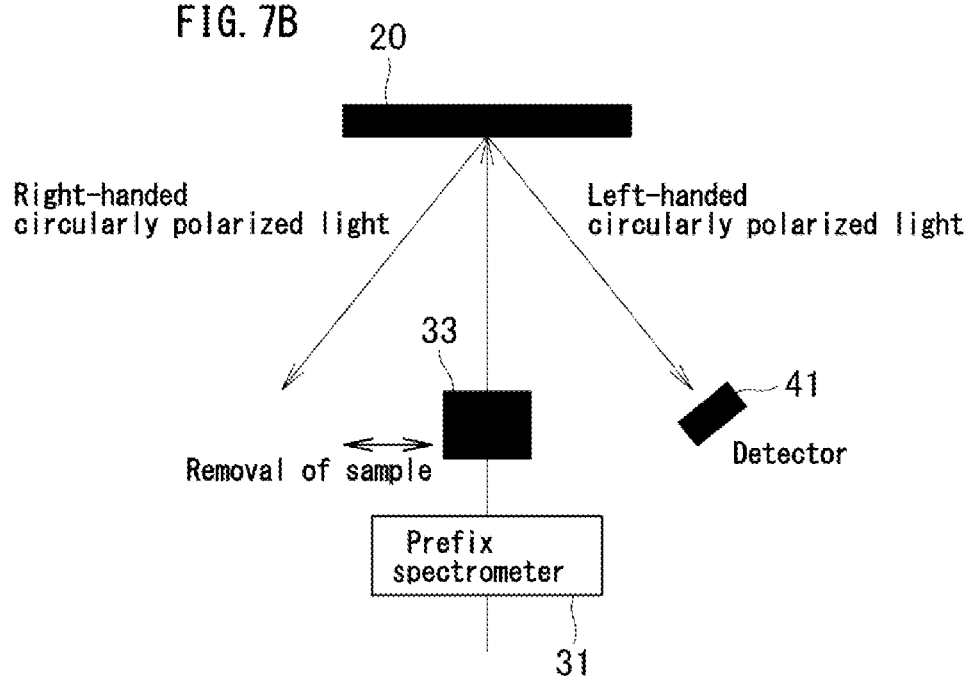
FIG. 7B is a diagram illustrating an overall structure of an optical measurement device according to a seventh embodiment.

FIG. 7A is an overall configuration of an optical measurement device according to a sixth embodiment. A chopper 32 is disposed on the optical path between the prefix spectrometer 31 and the reflective polarized-light separating diffraction-grating 20, so that irradiation and blocking of the measurement light are repeated by the action of the chopper 32. Moreover, FIG. 7B is an overall configuration of an optical measurement device according to a seventh embodiment. A removable sample holding means 33 is disposed on the optical path between the prefix spectrometer 31 and the reflective polarized-light separating diffraction-grating 20, so that a sample measurement and a background measurement are repeated by the action of the sample holding means 33. High-sensitivity measurement of optical properties can be performed by these means.

Regarding high-sensitivity measurement of optical properties, like in an optical measurement device according to an eighth embodiment of FIG. 8A, high-sensitivity measurement can be also performed by disposing a polarizer 34 to be perpendicular to a central axis of the optical path of the measurement light and providing a means for rotating the polarizer 34 around the central axis of the optical path. Moreover, like in an optical measurement device according to a ninth embodiment of FIG. 8B, high-sensitivity measurement can also be performed by disposing a PEM 35 on the optical path of the measurement light.

FIG. 9 is an overall configuration of an optical measurement device according to a tenth embodiment. The optical measurement device of FIG. 9 comprises: a reflective polarized-light separating diffraction-grating 20; an incident optical means 30 including a light source 36; and a detection optical means 40 including an array-type detector 42 such as CCD. The light source 36 emits a measurement light of a predetermined wavelength range. Similar to the optical measurement devices of FIG. 6 to FIG. 8, the measurement target may be disposed on the optical path of the incident optical means 30, or on the optical path between the reflective polarized-light separating diffraction-grating 20 and the array-type detector 42. According to the optical measurement device having such configuration, optical properties (such as circular dichroism (CD), linear dichroism (LD), circularly-polarized birefringence (CB), or linearly-polarized birefringence (LB)) regarding a plurality of wavelengths can be measured simultaneously.

Figure 10A:
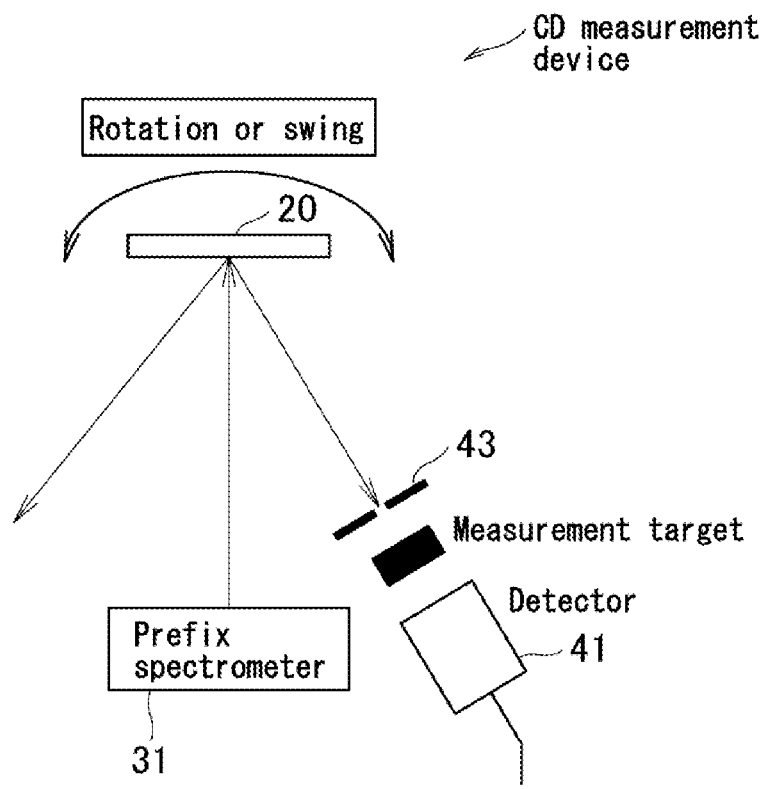
FIG. 10A is a diagram illustrating an overall structure of a circular dichroism measurement device according to an eleventh embodiment.
Figure 10B:
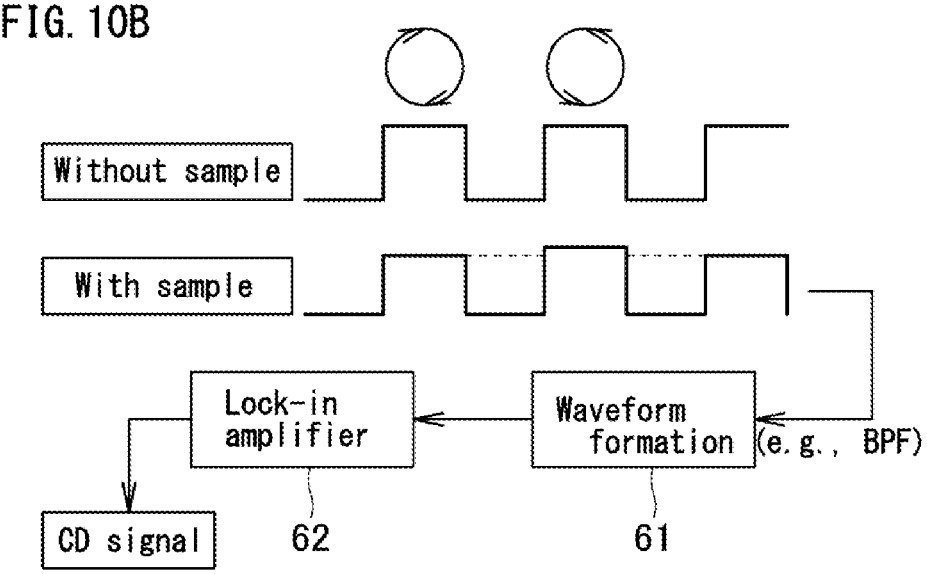
FIG. 10B is a diagram illustrating a signal processing means that calculates a CD signal from a detected signal thereof.

FIG. 10A is an overall configuration of a circular dichroism measurement device according to an eleventh embodiment, and FIG. 10B shows a signal processing means that calculates a CD signal from a detected signal thereof. The reference sign 43 shows an aperture. The reference sign 20 shows a polarized-light separating diffraction-grating formed with lattice structured bodies on both surfaces. In this circular dichroism measurement device, the right-handed circularly-polarized light and the left-handed circularly-polarized light are irradiated to the measurement target alternately by rotating or swinging the polarized-light separating diffraction-grating 20. Accordingly, as shown in FIG. 10B, a detected signal having a periodic change can be acquired in each case of with and without the sample, and high-sensitivity measurement of circular dichroism can be performed by using a waveform forming means 61 (such as BPF) and a lock-in amplifier 62.

Figure 11A:
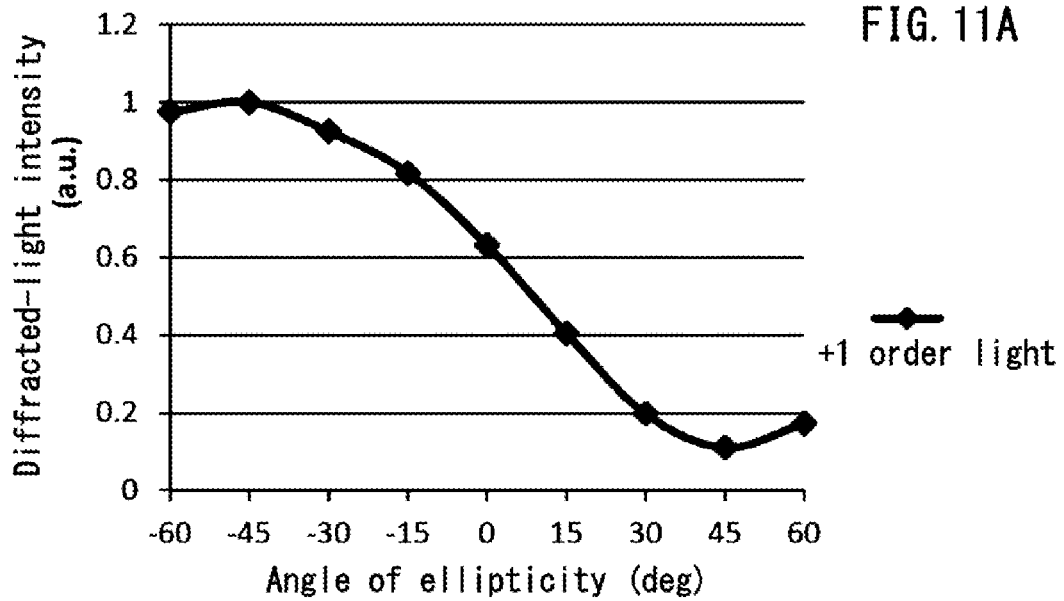
FIG. 11A and FIG. 11B are property graphs of the polarized-light separating diffraction-grating, and illustrate that detection sensitivity of the polarization state improves in the reflective polarized-light separating diffraction-grating than the transmissive type.
Figure 11B:
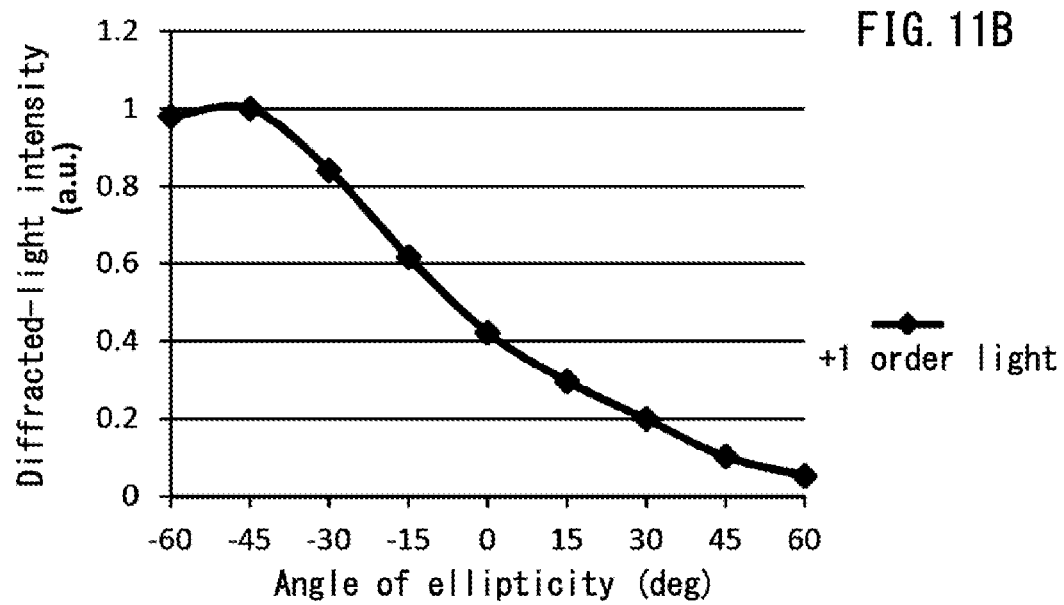

FIG. 11A and FIG. 11B show property graphs of the polarized-light separating diffraction-grating, and show that detection sensitivity of the polarization state in a predetermined angle of ellipticity improves in the reflective polarized-light separating diffraction-grating than the transmissive type. The horizontal axis of the graph shows the angle of ellipticity, and the vertical axis shows a diffracted-light intensity of the +1 order light. That is, by using the reflective polarized-light separating diffraction-grating of the present embodiment, and by selecting materials, thickness, and application methods such as an oblique deposition method of the reflection film (including the reflection surface), distribution of the diffracted-light intensity relative to the angle of ellipticity can be controlled when the angle of incidence is other than zero degrees. Therefore, sensitivity (S/N) relative to a predetermined angle of ellipticity can be improved.

According to the optical measurement device of the present embodiment, since it comprises the reflective polarized-light separating diffraction-grating, the optical path can be returned at the polarized-light separating diffraction-grating, and disposition of the configuration equipment can be made compact. Moreover, since it comprises the reflective polarized-light separating diffraction-grating, reduction in the amount of light by absorption of the ultraviolet light region can be suppressed compared to the transmissive polarized-light separating diffraction-grating, and optical measurement such as circular dichroism or polarized-light birefringence using the measurement light having a wide wavelength region ranging from ultraviolet region to infrared region can be performed. Moreover, the reflective polarized-light separating diffraction-grating divides the right-handed and left-handed circularly polarized lights contained in the incident light into different directions, so that optical measurement can be accelerated.

In the example of FIG. 11, linearity of diffraction intensity relative to the angle of ellipticity can be increased by coating the outermost surface with silver. Accordingly:

1) in the vicinity of the angle of ellipticity (−45 degrees and +45 degrees) of which the incident light is a circularly-polarized light, inclination of diffraction intensity relative to the angle of ellipticity can be made larger from a usual (transmissive type) small inclination. Accordingly, the change rate of the diffracted-light intensity can be made larger in the vicinities of −45 degrees and +45 degrees, so that sensitivity upon detection of the circularly-polarized light can be improved effectively. Moreover, 2) in all angle range, inclination can be made more constant without depending on the angle of ellipticity. Accordingly, measurement can be performed at a constant sensitivity in all regions without depending on the polarization state (angle of ellipticity) of the incident light.

REFERENCE SIGNS LIST

1: Substrate; 2: Reflection surface; 3: Lattice structured body assembly; 11, 13: Substrate; 12: Lattice uneven structured body assembly; 10: Optical measurement device; 20: Polarized-light separating diffraction-grating; 30: Incident optical means; 40: Detection optical means; 51: Birefringent structured body.

The invention claimed is:

1. A reflective polarized-light separating diffraction-element comprising:
   a substrate;
   a reflection surface formed on a surface of the substrate; and
   a lattice structured body assembly that is provided on the reflection surface and exhibits a form birefringence, wherein
   the lattice structured body assembly includes lattice structured bodies of a plurality of patterns having lattice structures of different azimuths,
   these lattice structured bodies of a plurality of patterns are aligned in a predetermined direction on the reflection surface so that the azimuths of the lattice structures change in a structurally periodic manner,
   the surface of the substrate is formed with stepped portions along the predetermined direction,
   each lattice structured body including a pattern, of the plurality of patterns, is provided on a respective stepped portion, of the stepped portions, in accordance with the surface of the substrate, and
   the stepped portions are repeated in accordance with a structurally periodic change of the azimuth.

2. The reflective polarized-light separating diffraction-element of claim 1, wherein
   the reflection surface and the lattice structured bodies are formed on both surfaces of the substrate.

3. An optical measurement device comprising:
   a reflective polarized-light separating diffraction-element of claim 2;
   a spectrometer configured to make a measurement light incident on the reflective polarized-light separating diffraction-element; and
   an optical detector configured to detect lights in at least one or more specific directions among reflected lights that are diffracted by the reflective polarized-light separating diffraction-element,
   wherein
   the optical measurement device measures optical properties of a measurement target disposed on an optical path of the spectrometer or the optical detector.

4. An optical measurement device comprising:
   a reflective polarized-light separating diffraction-element of claim 1;
   a spectrometer configured to make a measurement light incident on the reflective polarized-light separating diffraction-element; and
   an optical detector configured to detect lights in at least one or more specific directions among reflected lights that are diffracted by the reflective polarized-light separating diffraction-element,
   wherein
   the optical measurement device measures optical properties of a measurement target disposed on an optical path of the spectrometer or the optical detector.

5. A reflective polarized-light separating diffraction-element comprising:
   a substrate; and
   a lattice uneven structured body assembly that is formed on a surface of the substrate and exhibits a form birefringence,
   wherein
   an uneven surface of the lattice uneven structured body assembly is a reflection surface,
   the lattice uneven structured body assembly includes lattice uneven structured bodies of a plurality of patterns having lattice uneven structures of different azimuths,
   these lattice uneven structured bodies of a plurality of patterns are aligned on the surface of the substrate in a predetermined direction so that the azimuths of the lattice uneven structures change in a structurally periodic manner,
   the surface of the substrate is formed with stepped portions along the predetermined direction,
   each uneven lattice structured body including a pattern, of the plurality of patterns, is provided on a respective stepped portion, of the stepped portions, in accordance with the surface of the substrate, and
   the stepped portions are repeated in accordance with a structurally periodic change of the azimuth.

6. The reflective polarized-light separating diffraction-element of claim 4, wherein the lattice uneven structured bodies and the reflection surface are formed on both surfaces of the substrate.

7. An optical measurement device comprising:
a reflective polarized-light separating diffraction-element of claim 6;
a spectrometer configured to make a measurement light incident on the reflective polarized-light separating diffraction-element; and
an optical detector configured to detect lights in at least one or more specific directions among reflected lights that are diffracted by the reflective polarized-light separating diffraction-element,
wherein
the optical measurement device measures optical properties of a measurement target disposed on an optical path of the spectrometer or the optical detector.

8. An optical measurement device comprising:
a reflective polarized-light separating diffraction-element of claim 5;
a spectrometer configured to make a measurement light incident on the reflective polarized-light separating diffraction-element; and
an optical detector configured to detect lights in at least one or more specific directions among reflected lights that are diffracted by the reflective polarized-light separating diffraction-element,
wherein
the optical measurement device measures optical properties of a measurement target disposed on an optical path of the spectrometer or the optical detector.

* * * * *